US012203529B2

(12) United States Patent
Nicholson

(10) Patent No.: US 12,203,529 B2
(45) Date of Patent: *Jan. 21, 2025

(54) SHACKLE

(71) Applicant: RIGGING CONCEPTS LIMITED, Auckland (NZ)

(72) Inventor: Nicholas Jerzy Thomas Nicholson, Auckland (NZ)

(73) Assignee: Rigging Concepts Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,816

(22) Filed: Jun. 27, 2024

(65) Prior Publication Data

US 2024/0344593 A1  Oct. 17, 2024

Related U.S. Application Data

(63) Continuation of application No. 18/719,804, filed as application No. PCT/IB2022/062170 on Dec. 14, 2022.

(30) Foreign Application Priority Data

Dec. 14, 2021 (AU) ................................ 2021904056
Mar. 31, 2022 (AU) ................................ 2022900846
Jun. 23, 2022 (AU) ................................ 2022901732

(51) Int. Cl.
*F16G 15/06* (2006.01)
*D07B 1/16* (2006.01)
(Continued)

(52) U.S. Cl.
CPC .............. *F16G 15/06* (2013.01); *D07B 1/162* (2013.01); *F16G 11/14* (2013.01); *B66C 1/66* (2013.01);
(Continued)

(58) Field of Classification Search
CPC ......... F16G 15/06; F16G 11/14; D07B 1/162; D07B 2201/2092; D07B 2205/205; B66C 1/66

See application file for complete search history.

(56) References Cited

U.S. PATENT DOCUMENTS 1,365,677 A * 1/1921 Flynn, Jr. ................ F16B 45/00
24/698.3
2012/0159987 A1* 6/2012 Walchle ................... F16B 45/00
63/3.2
(Continued)

FOREIGN PATENT DOCUMENTS

CN 105442366 A 3/2016
CN 214270049 U 9/2021
(Continued)

OTHER PUBLICATIONS

International Search Report and Written Opinion, mailed Feb. 17, 2023, for International Patent Application No. PCT/IB2022/062170. (9 pages).

(Continued)

*Primary Examiner* — David M Upchurch
(74) *Attorney, Agent, or Firm* — Seed IP Law Group LLP

(57) ABSTRACT

The present invention relates to a shackle. The shackle comprises a shackle body for use with a shackle pin. The shackle body comprises a flexible elongate member comprising at least one length of rope circuitously formed so that the flexible elongate member passes through itself and defines three sequentially adjacent noose portions. Three sequentially adjacent noose portions comprise an intermediate noose portion and two end noose portions at opposing ends of the shackle body.

19 Claims, 11 Drawing Sheets

(51) Int. Cl.
*F16G 11/14* (2006.01)
*B66C 1/66* (2006.01)

(52) U.S. Cl.
CPC ............... *D07B 2201/2092* (2013.01); *D07B 2205/205* (2013.01)

(56) References Cited

U.S. PATENT DOCUMENTS

| | | |
|---|---|---|
| 2017/0108081 A1 | 4/2017 | Laurant |
| 2017/0334533 A1* | 11/2017 | Herman .................... B63H 9/10 |
| 2020/0339391 A1* | 10/2020 | Chant ....................... B66C 1/12 |
| 2021/0094159 A1 | 4/2021 | Veka |
| 2021/0215230 A1 | 7/2021 | Howard |

FOREIGN PATENT DOCUMENTS

| | | |
|---|---|---|
| DE | 296 08 144 U1 | 7/1996 |
| FR | 2 893 378 A1 | 5/2007 |
| WO | 2020/041629 A1 | 2/2020 |
| WO | 2020/245771 A1 | 12/2020 |

OTHER PUBLICATIONS

International Preliminary Report on Patentability, mailed Oct. 23, 2023, for International Patent Application No. PCT/IB2022/062170. (5 pages).

\* cited by examiner

Section A-A

Section B-B

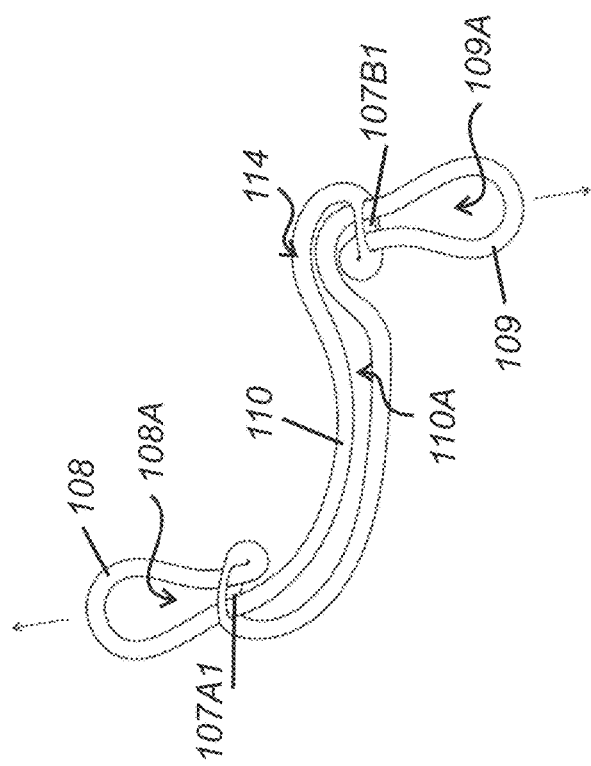
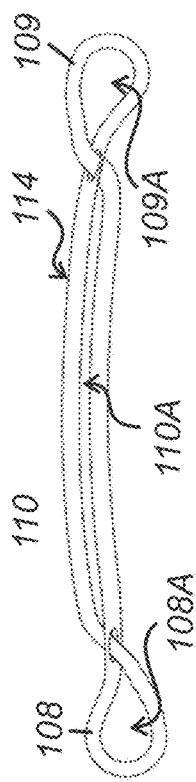
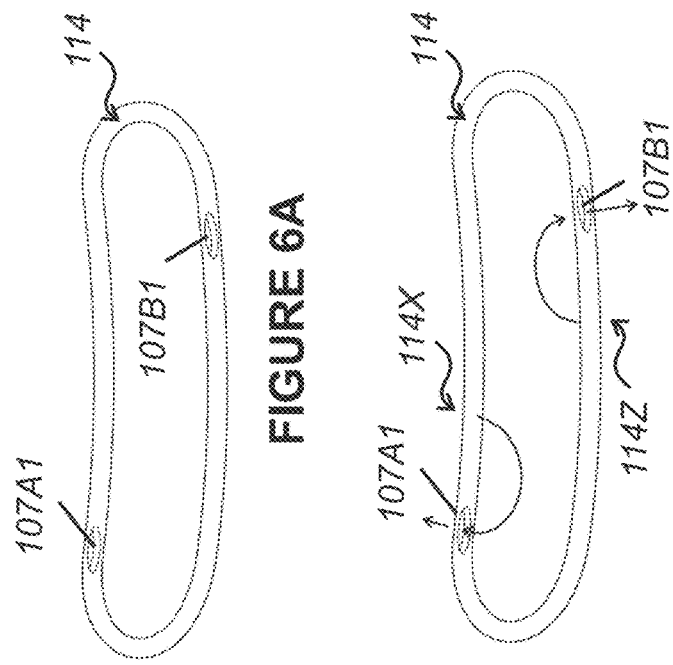
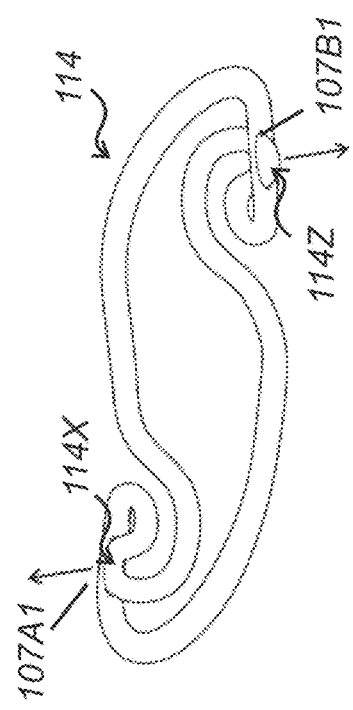
FIGURE 6A
FIGURE 6B
FIGURE 6C
FIGURE 6D
FIGURE 6E

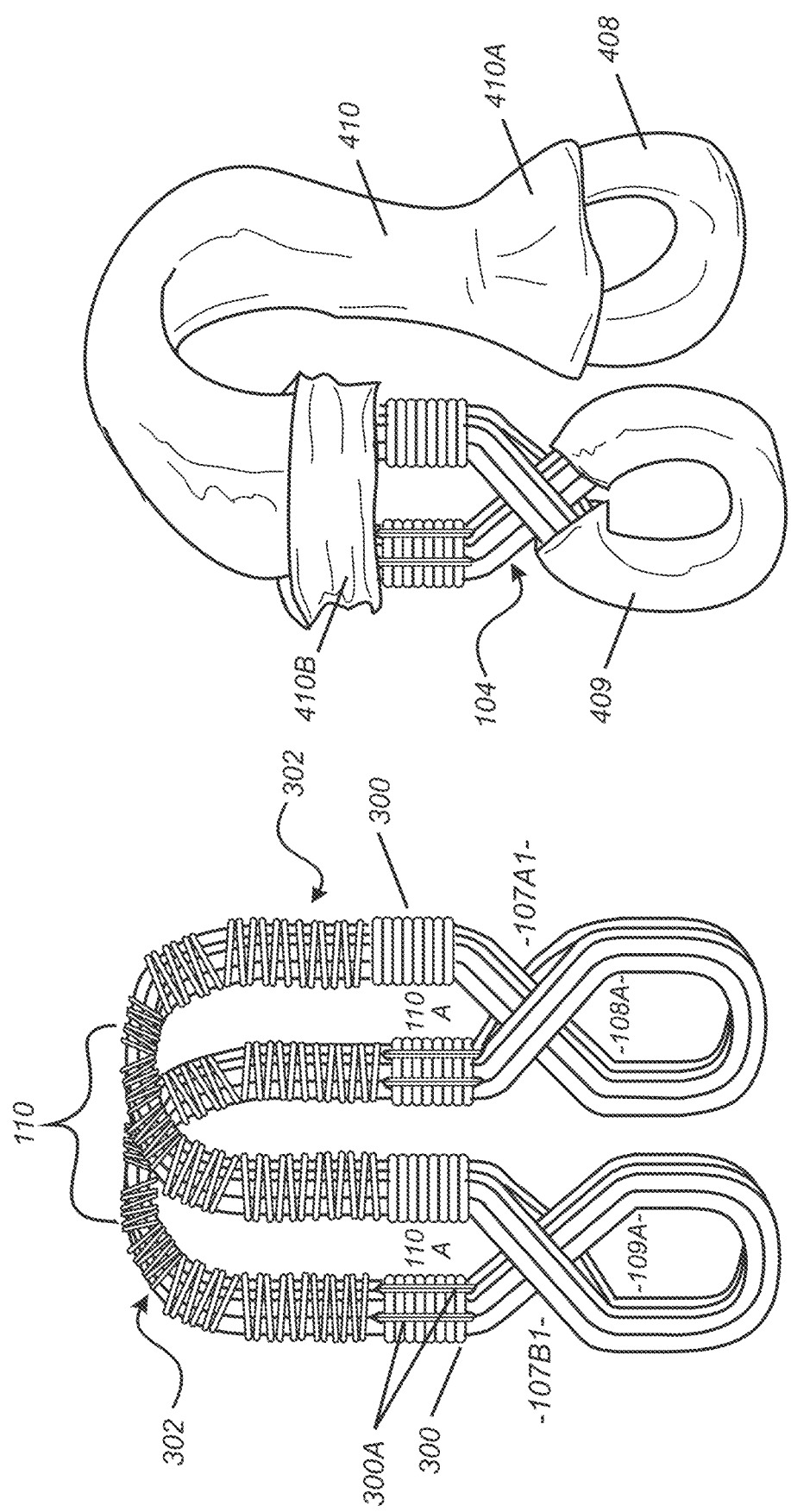

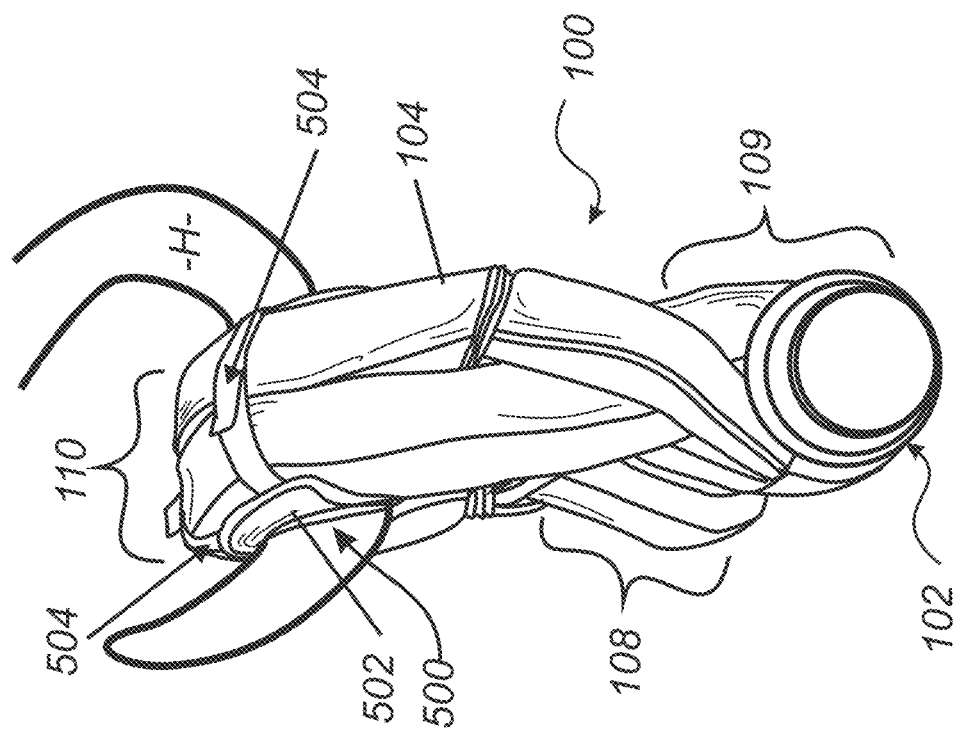
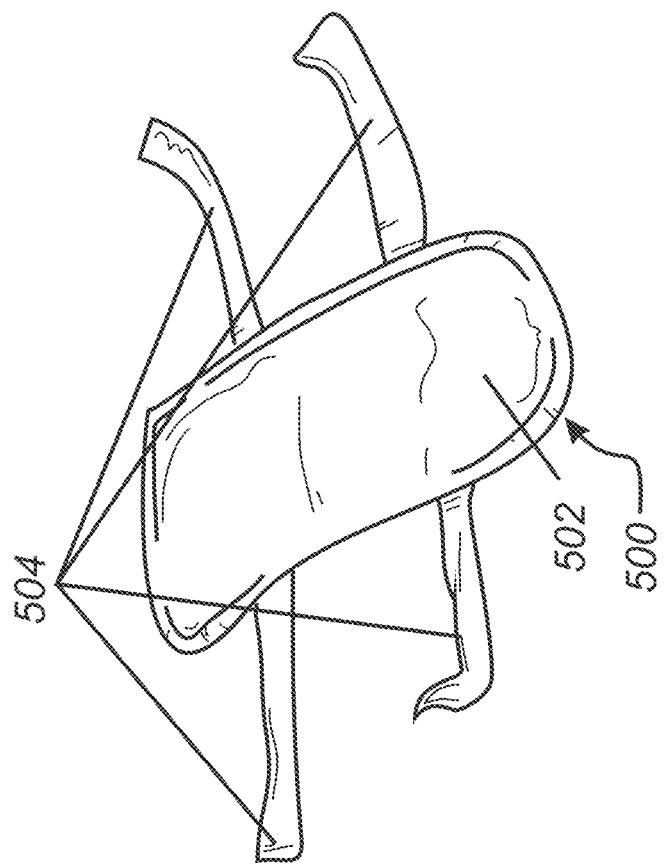
FIGURE 11B
FIGURE 11A ent as using a new rope on the same button will not be
SHACKLE

CROSS-REFERENCE TO RELATED APPLICATION(S)

This application is a continuation of U.S. patent application Ser. No. 18/719,804, filed Jun. 13, 2024; which is a 371 of International Patent Application No. PCT/IB2022/062170, filed Dec. 14, 2022, which are hereby incorporated by reference as if fully set forth herein.

The present invention relates to a shackle. More particularly but not exclusively it relates to a shackle for lifting, rigging, towing, slinging, securing loads, pulling such as during construction, vehicle recovery operations, and/or other purposes.

BACKGROUND OF THE INVENTION

Coupling devices such as shackles are typically made from steel or other suitable metal. They are commonly used for lifting in the marine, construction, mining and other similar industries for lifting, towing, slinging, securing loads, pulling and vehicle recovery operations and other purposes.

However, such metal shackles can be very heavy and bulky especially if they are designed to be used in heavy load situations where they need to be strong. Consequently, such shackles are generally difficult or impossible to be manually lifted and deployed by a single person. Some shackles (e.g. steel shackles) for example may weigh a lot. Multiple persons and additional equipment for safe lifting and deployment of heavy shackles may be required. This may not be possible or commercially desirable or for personal safety reasons. Further, the heavy weight and bulkiness of steel shackles means that they are not easy to store.

Compromising on the strength of a coupling device to reduce weight and provide for less bulky coupling is not a desirable solution because if the coupling device fails, the consequences can be catastrophic.

Metal shackles have a high capacity for stored energy including in a form of elastic yielding of the material of the shackle when under high loading when approaching its break strength. When such a shackle breaks under load, that stored energy is often dissipated in a catastrophic manner. Parts of a metal shackle breaking under load can become projectiles that can cause significant damage and even personal injury. The parts that a breaking shackle is coupled to can also be a danger to property and persons nearby.

Soft shackles are known. For example, WO 2016/073974 discloses a soft shackle that uses a button. However, such button shackles come with several disadvantages. For example, it is not uncommon for the rope to be damaged or otherwise needing replacement. With the arrangement as disclosed in WO 2016/073974, the whole shackle will need to be replaced in the event the rope needs changing/replacement as using a new rope on the same button will not be possible. Even if it was possible, it will not be easy to couple the button to a new rope properly and safely and doing so will require specialist skills. Soft shackle that use such substantially round or spherical button can accidentally open and disengage the secured load which can be dangerous. Additionally, such a two-piece button will not be suitable for holding heavier load as heavier loads can cause the two pieces of the button to split apart thereby disengaging the load.

It is an object of the present invention to provide a shackle and/or a coupling device that overcomes or at least partially ameliorates some of the abovementioned disadvantages or which at least provides the public with a useful choice.

BRIEF DESCRIPTION OF THE INVENTION

In a first aspect, the invention resides in a shackle comprising: a shackle body for use with a shackle pin, the shackle body comprising: a flexible elongate member comprising at least one length of rope circuitously formed so that the flexible elongate member passes through itself and defines three sequentially adjacent noose portions.

Preferably, the three sequentially adjacent noose portions comprise (e.g., formed as or being or has) an intermediate noose portion and two end noose portions at opposing ends of the shackle body.

Preferably, a contraction or extension of the intermediate noose portion causes a movement of said length of rope through where the elongate member passes through itself, thereby effecting a proportional tightening or loosening of one or each of said end noose portions.

Preferably, the shackle pin, when used with the shackle body, is configured to extend through eyes defined by the end noose portions such that a tightening of said end noose portions promotes a contraction of said eyes about said shackle pin and a corresponding coupling of the shackle pin to the shackle body.

Preferably, the at least one length of rope is circuitously formed so as to define a continuous endless circuit such that the flexible elongate member passes through itself at two intersections of itself.

Preferably, a first intersection of the two intersections defines a transition of the flexible elongate member from the intermediate noose portion to a first end noose portion of the two end noose portions, and a second intersection of the two intersections defines a transition of the flexible elongate member from the intermediate noose portion to a second end noose portion of the two end noose portions.

Preferably, notionally defined at or around two parts of the flexible elongate member that define the intermediate noose portion is a first notional section of said flexible elongate member and a second notional section of said flexible elongate member, wherein at the first intersection of the flexible elongate member the first section of said flexible elongate member passes through a second parting of the second section, and at the second intersection of the flexible elongate member the second section of said flexible elongate member passes through a first parting of the first section.

Preferably, the first parting of the first section is formed by a split within the at least one length of rope thereat and the second parting is formed by a split within the at least one length of rope thereat, the length of rope passing through said splits of said partings such that its movement therethrough upon a contraction or extension of the intermediate noose portion effects a proportional tightening or loosening of one or each of said end noose portions.

Preferably, the flexible elongate member comprises a plurality of rope sections of said length of rope, each rope section corresponding to a loop of a plurality of loops that the length of rope circuitously forms.

Preferably, the first parting of the first section is formed by a separation of a portion of at least one of the plurality of rope sections from a portion(s) of the other of the plurality of rope section(s) at the first section, and the second parting of the second section is formed by a separation of a portion of at least one of the plurality of rope sections from a portion(s) of the other of the plurality of rope section(s) at the second section.

Preferably, at least one of the plurality of rope sections at the first section of said flexible elongate member passes through the second parting of the second section, and wherein at least one of the plurality of rope sections at the second section of said flexible elongate member passes through the first parting of the first section, such that, a movement of said at least one of the plurality of rope sections at the first and second sections through said first and second partings, upon a contraction or extension of the intermediate noose portion, effects a proportional tightening or loosening of said end noose portions.

Preferably, at least two of the plurality of rope sections at the first section of said flexible elongate member passes through the second parting of the second section in a coplanar, parallel, near-adjacent and/or near-contiguous arrangement relative one another, and wherein at least two of the plurality of rope sections at the second section of said flexible elongate member passes through the first parting of the first section in a coplanar, parallel, near-adjacent and/or near-contiguous arrangement relative one another.

Preferably, the flexible elongate member comprises two rope sections of said length of rope, wherein both of the rope sections at the first section of said flexible elongate member pass through the second parting of the second section so formed by separation of portion(s) of the two rope sections at the second section from one another, and wherein both of the rope sections at the second section of said flexible elongate member pass through the first parting of the first section so formed by separation of portion(s) of the two rope sections at the first section from one another.

Preferably, the two rope sections at the first and second sections of said flexible elongate member are arranged in a coplanar, parallel, near-adjacent and/or near-contiguous arrangement relative one another when passing through the first and second partings of said first and second sections.

Preferably, the flexible elongate member comprises four rope sections of said length of rope, wherein all four of the rope sections at the first section of said flexible elongate member pass through the second parting of the second section so formed by separation of portion(s) of two of the rope sections at the second section from the other two of the rope sections, and wherein all four of the rope sections at the second section of said flexible elongate member pass through the first parting of the first section so formed by separation of portion(s) of two of the rope sections at the second section from the other two of the rope sections.

Preferably, the four rope sections at the first and second sections of said flexible elongate member, when passing through the first and second partings of said first and second sections, are arranged in a stacked arrangement of a first pair of the rope sections atop a second pair of the rope sections, both rope sections of each of the first and second pair arranged in a coplanar, parallel, near-adjacent and/or near-contiguous arrangement relative one another.

Preferably, the at least one length of rope comprises a continuous integrally formed length of rope or a continuous length of rope formed via end-joining of a plurality of discrete non-continuous lengths of rope.

Preferably, a diameter of the flexible elongate member is substantially equal to a diameter of the shackle pin when so used with the shackle body.

Preferably, a first twist of the flexible elongate member is defined by and located at the first intersection of the two intersections and a second twist of the flexible elongate member is defined by and located at the second intersection of the two intersections.

Preferably, the three sequentially adjacent noose portions are arranged as a continuous triple infinity loop.

Preferably, the three sequentially adjacent noose portions are arranged as a continuous endless loop.

Preferably, the shackle pin forms part of a pin assembly, the pin assembly further comprising a clamping member that is configured to move between a clamped position and an unclamped position, wherein when in the clamped position the clamping member is configured to clamp at least one end of the pin thereby facilitating locking and securing of the pin within the eyes of the end noose portions, and when in when in the unclamped position the clamping member is configured to unclamp the pin thereby allowing release of the pin from the eyes of the end noose portions.

Preferably, the flexible elongate member is at least in part protectively and collectively ensheathed using at least one cover extending substantially around and along said flexible elongate member.

Preferably, the at least one cover comprises of any one or more of an aramid fibre, a para-aramid high performance fibre, Technora®, Kevlar®, Ultra High Modulus PolyEthylene Fibre and/or Dyneema®.

Preferably, the at least one cover is at least partially removable from at least part of the flexible elongate member.

Preferably, the at least one length of rope comprises of any one or more of a multi-braided rope, an aramid fibre, a para-aramid high performance fibre, an Ultra-High Molecular Weight Polyethylene (UHMwPE), a High Molecular Weight Polyethylene (HMwPE), Technora®, Kevlar®, Dyneema® and/or Spectra®.

Preferably, the shackle comprises at least one holding member arranged around the elongate member at or adjacent the first and/or second intersection(s).

Preferably, the shackle comprises at least one holding member arranged around the elongate member at or adjacent the first and/or second parting(s).

Preferably, the shackle comprises at least one holding member arranged around the elongate member at the first and/or second noose portion(s).

Preferably, the shackle comprises at least one holding member arranged around the elongate member at the first and/or second noose portion(s) and adjacent the first and/or second intersection(s).

Preferably, the holding member is configured to position at least one rope section of a plurality of rope sections relative the other rope sections, at or adjacent the first and/or second intersection(s) and/or first and/or second parting(s).

Preferably, the holding member is configured to position at least one rope section of a plurality of rope sections relative the other rope section and at least partly maintain said relative position(s) during use of the shackle.

Preferably, the holding member comprises at least one holding member coupler extending along a length of said holding member between one face thereof and an opposing face thereof.

Preferably, the at least one holding member coupler extends through and in between any two or more of the plurality of rope sections of the elongate member.

Preferably, the shackle comprises a plurality of support windings extending along at least part of the length of the elongate member between the first and second intersections.

Preferably, the plurality of support windings is configured to position at least one rope section of a plurality of rope sections relative the other rope sections, along at least part of the length of the elongate member between the first and second intersections.

Preferably, the plurality of support windings is configured to position at least one rope section of a plurality of rope sections relative the other rope section and at least partly maintain said relative position(s) during use of the shackle.

Preferably, the holding member comprises an elastic or resilient material.

Preferably, the holding member comprises string, elastic or rubber string, single-braid rope, multi-braided rope, Ultra-High Molecular Weight Polyethylene (UHMwPE) or High Molecular Weight Polyethylene (HMwPE) and/or rope as sold under the trade names Dyneema® or Spectra® or constituent fibre(s) derived therefrom.

Preferably, the plurality of support windings comprises an elastic or resilient material.

Preferably, the plurality of support windings comprises string, elastic or rubber string, single-braid rope, multi-braided rope, Ultra-High Molecular Weight Polyethylene (UHMwPE) or High Molecular Weight Polyethylene (HMwPE) and/or rope as sold under the trade names Dyneema® or Spectra® or constituent fibre(s) derived therefrom.

Preferably, the shackle comprises an elastic sheath arrangement comprising main sheath and first and second end noose sheaths.

Preferably, the main sheath wraps around and along the intermediate noose portion.

Preferably, the first end noose sheath wraps around and along the first end noose portion.

Preferably, the second end noose sheath wraps around and along the second end noose portion.

Preferably the main sheath and first and second end noose sheaths each comprise a single body of elastic material.

Preferably, the body of elastic material comprises an elastic fibre arrangement comprising elastic or resilient fibres extending along a length of the elongate member.

Preferably, the main sheath and first and second end noose sheaths each stretch and contract in unison and/or in concert with the respective intermediate noose portion and first and second end noose portions of the shackle body.

Preferably, the main sheath and first and second end noose sheaths each temporarily change in shape and/or deform in concert with the shackle body.

Preferably, the main sheath and first and second end noose sheaths each and/or together stretch and contract in unison and/or in concert with the respective intermediate noose portion and first and second end noose portions of the shackle body.

Preferably, the main sheath and first and second end noose sheaths each and/or together change in shape and/or deform in concert with the shackle body.

Preferably, the elastic sheath arrangement stretches and contracts in unison and/or in concert with the shackle body.

Preferably, the elastic sheath arrangement changes in shape and/or deforms with the shackle body.

Preferably the main sheath, first end noose sheath and/or second end noose sheath each comprise a unitary body of elastic material.

Preferably the main sheath, first end noose sheath and/or second end noose sheath each comprise a unitary body of elastic material such that an end of the main sheath, first end noose sheath and/or second end noose sheath may be pulled, rolled and/or folded up and away from the elongate member for inspection of the elongate member.

Preferably, the elastic sheath arrangement comprises Kevlar.

Preferably, the main sheath, first end noose sheath and/or second end noose sheath each comprise Kevlar.

Preferably, the elastic sheath arrangement comprises a material that is durable, stretchable and/or has high resistance against abrasion, tears, scuffs and friction.

Preferably, the main sheath, first end noose sheath and/or second end noose sheath each comprises a material that is durable, stretchable and/or has high resistance against abrasion, tears, scuffs and friction.

Preferably, the shackle comprises a hook guard comprising a body portion and resilient connector portions.

Preferably, the hook guard is configured to extend along the intermediate portion and wrap at least partially around it.

Preferably, the resilient connector portions of the hook guard are configured to extend around the intermediate portion to connect to one another and thereby removably affix the hook guard to said intermediate portion.

Preferably, the resilient connector portions comprise hook and eyelet fasteners.

Preferably, the resilient connector portions comprise Velcro.

Preferably, the hook guard is configured to be placed at the shackle body at a position where a hook of a lifting means engages with the shackle body to lift and/or move the shackle.

Preferably, the hook guard is configured to provide an intermediate surface between a hook of a lifting means and the shackle body during lifting and/or movement of the shackle by said lifting means.

Preferably, the hook guard is configured to be consumable and/or replaceable.

Preferably, the end noose portions together define a bow of the shackle.

Preferably, the end noose portions together define a bow of the shackle through which, in use, a shackle pin may be configured to extend through.

Preferably, the pin, when used with the shackle body, is configured to extend through the bow such that a tightening of said bow promotes a contraction of the bow about said shackle pin and a corresponding coupling of the shackle pin to the shackle body.

Preferably, the bow of the shackle is configured to elastically deform based on a contraction or extension of the intermediate noose portion and/or a tightening or loosening of the end noose portions.

Preferably, the bow of the shackle is configured to extend or contract proportionally with a contraction or extension of the flexible elongate member. Preferably, the rope section(s) of the flexible elongate member, at the end noose portions, is/are oriented perpendicular, transverse, right-angled or about 90 degrees relative a longitudinal axis or length of a shackle pin when in use.

Preferably, the rope section(s) of the flexible elongate member, at the intermediate noose portion, is/are oriented perpendicular, transverse, right-angled or about 90 degrees relative a longitudinal axis or length of a lifting or movement member, such as a hook, when in use.

Preferably, the rope section(s) of the flexible elongate member, at the end noose portions, is/are oriented perpendicular, transverse, right-angled or about 90 degrees relative the rope section(s) of the flexible elongate member, at the intermediate noose portion.

Preferably, the flexible elongate member is configured such that its rope section(s), when in use, are oriented at the intermediate noose portion and/or end noose portions in a manner so as to present a maximum surface area for contact with a lifting or movement member such as a hook and/or a shackle pin, respectively.

In a second aspect, the invention resides in a method of forming the flexible elongate member of the shackle of any one of the preceding claims, the method comprising:
  a) providing at least one length of rope that is either:
     i. a continuous integrally formed length of rope; or
     ii. a continuous length of rope formed via end-joining of a plurality of discrete non-continuous lengths of rope;
  b) circuitously arranging said at least one length of rope to form a lap or loop on a continuous endless circuit, wherein on the lap or loop the at least one length of rope passes through itself at two intersections;
  c) either performing step b) once such that said at least one length of rope forms a single lap or loop about the continuous endless circuit, or repeating step b) such that said at least one length of rope forms a plurality of laps or loops on the continuous endless circuit so as to define a corresponding plurality of rope sections of the at least one length of rope;
  d) end-joining the at least one length of rope to itself so as to define three sequentially adjacent continuous rope-enclosed noose portions comprising an intermediate noose portion defined between the two intersections and two end noose portions at opposing ends thereof.

In a third aspect, the invention resides in a shackle comprising: a shackle pin; a shackle body coupled to the shackle pin, the shackle body comprising: a flexible elongate member comprising of at least one length of rope formed into a continuous endless circuit, the flexible elongate member passing through itself at at least two intersections of the circuit so as to define a continuous triple infinity loop.

Preferably, the flexible elongate member comprises two end noose portions at opposing ends thereof and an intermediate noose portion therebetween, wherein a contraction or extension of the intermediate noose portion causes a movement of said flexible elongate member through said intersections of the circuit thereby effecting a proportional tightening or loosening of one or each of said end noose portions.

Preferably, the end noose portions together define a bow of the shackle.

Preferably, the end noose portions together define a bow of the shackle through which, in use, a shackle pin may be configured to extend through.

Preferably, the pin, when used with the shackle body, is configured to extend through the bow such that a tightening of said bow promotes a contraction of the bow about said shackle pin and a corresponding coupling of the shackle pin to the shackle body.

Preferably, the bow of the shackle is configured to elastically deform based on a contraction or extension of the intermediate noose portion and/or a tightening or loosening of the end noose portions.

Preferably, the bow of the shackle is configured to extend or contract proportionally with a contraction or extension of the flexible elongate member.

Preferably, the rope section(s) of the flexible elongate member, at the end noose portions, is/are oriented perpendicular, transverse, right-angled or about 90 degrees relative a longitudinal axis or length of a shackle pin when in use.

Preferably, the rope section(s) of the flexible elongate member, at the intermediate noose portion, is/are oriented perpendicular, transverse, right-angled or about 90 degrees relative a longitudinal axis or length of a lifting or movement member, such as a hook, when in use.

Preferably, the rope section(s) of the flexible elongate member, at the end noose portions, is/are oriented perpendicular, transverse, right-angled or about 90 degrees relative the rope section(s) of the flexible elongate member, at the intermediate noose portion.

Preferably, the flexible elongate member is configured such that its rope section(s), when in use, are oriented at the intermediate noose portion and/or end noose portions in a manner so as to present a maximum surface area for contact with a lifting or movement member such as a hook and/or a shackle pin, respectively. In a fourth aspect, the invention resides in a shackle comprising: a shackle pin; a shackle body coupled to the shackle pin, the shackle body comprising: a flexible elongated member comprising of at least one length of rope arranged into a continuous endless circuit, wherein the circuit is of a double twisted configuration where the flexible elongated member defines two end noose portions at opposing ends thereof and an intermediate noose portion therebetween, the flexible elongated member twice passing through itself at intersections between the intermediate noose portion and the end noose portions.

Preferably, a contraction or extension of the intermediate noose portion causes a movement of said at least one rope through said intersections thereby effecting a proportional tightening or loosening of one or each of said end noose portions.

Preferably, the end noose portions together define a bow of the shackle.

Preferably, the end noose portions together define a bow of the shackle through which, in use, a shackle pin may be configured to extend through.

Preferably, the pin, when used with the shackle body, is configured to extend through the bow such that a tightening of said bow promotes a contraction of the bow about said shackle pin and a corresponding coupling of the shackle pin to the shackle body.

Preferably, the bow of the shackle is configured to elastically deform based on a contraction or extension of the intermediate noose portion and/or a tightening or loosening of the end noose portions.

Preferably, the bow of the shackle is configured to extend or contract proportionally with a contraction or extension of the flexible elongate member.

Preferably, the rope section(s) of the flexible elongate member, at the end noose portions, is/are oriented perpendicular, transverse, right-angled or about 90 degrees relative a longitudinal axis or length of a shackle pin when in use.

Preferably, the rope section(s) of the flexible elongate member, at the intermediate noose portion, is/are oriented perpendicular, transverse, right-angled or about 90 degrees relative a longitudinal axis or length of a lifting or movement member, such as a hook, when in use.

Preferably, the rope section(s) of the flexible elongate member, at the end noose portions, is/are oriented perpendicular, transverse, right-angled or about 90 degrees relative the rope section(s) of the flexible elongate member, at the intermediate noose portion.

Preferably, the flexible elongate member is configured such that its rope section(s), when in use, is/are oriented at the intermediate noose portion and/or end noose portions in a manner so as to present a maximum surface area for contact with a lifting or movement member such as a hook and/or a shackle pin, respectively. In a fifth aspect, the invention resides in a shackle body for use with a shackle pin, the shackle body comprising: a flexible elongated member comprising of at least one length of rope arranged as an endless circuit having three continuous nooses so as to define two end noose portions at opposing ends of the shackle body and an intermediate noose portion therebetween.

Preferably, a contraction or extension of the intermediate noose portion causes a proportional tightening or loosening of one or each of the end noose portions arranged at opposing ends of the shackle body.

Preferably, the end noose portions together define a bow of the shackle.

Preferably, the end noose portions together define a bow of the shackle through which, in use, a shackle pin may be configured to extend through.

Preferably, the pin, when used with the shackle body, is configured to extend through the bow such that a tightening of said bow promotes a contraction of the bow about said shackle pin and a corresponding coupling of the shackle pin to the shackle body.

Preferably, the bow of the shackle is configured to elastically deform based on a contraction or extension of the intermediate noose portion and/or a tightening or loosening of the end noose portions.

Preferably, the bow of the shackle is configured to extend or contract proportionally with a contraction or extension of the flexible elongate member.

Preferably, the rope section(s) of the flexible elongate member, at the end noose portions, is/are oriented perpendicular, transverse, right-angled or about 90 degrees relative a longitudinal axis or length of a shackle pin when in use.

Preferably, the rope section(s) of the flexible elongate member, at the intermediate noose portion, is/are oriented perpendicular, transverse, right-angled or about 90 degrees relative a longitudinal axis or length of a lifting or movement member, such as a hook, when in use.

Preferably, the rope section(s) of the flexible elongate member, at the end noose portions, is/are oriented perpendicular, transverse, right-angled or about 90 degrees relative the rope section(s) of the flexible elongate member, at the intermediate noose portion.

Preferably, the flexible elongate member is configured such that its rope section(s), when in use, is/are oriented at the intermediate noose portion and/or end noose portions in a manner so as to present a maximum surface area for contact with a lifting or movement member such as a hook and/or a shackle pin, respectively. In a sixth aspect, the invention resides in a shackle body for use with a shackle pin, the shackle body comprising: a flexible elongated member comprising of at least one length of rope arranged as a continuous endless loop that is double twisted and defining between two ends of the loop a first notional section of said elongated member and a second notional section of said elongated member, wherein: at a first twist of the loop the first section of said elongated member passes through a parting of the second section, and at the second twist of the loop the second section of said elongated member passes through a parting of the first section.

Preferably, the length of rope defines three sequentially adjacent noose portions of the flexible elongate member.

Preferably, the three sequentially adjacent noose portions comprise two end noose portions at opposing ends of the flexible elongate member and an intermediate noose portion therebetween, wherein a contraction or extension of the intermediate noose portion causes a proportional tightening or loosening of one or each of the end noose portions.

In a seventh aspect, the invention resides in a shackle comprising:
a shackle body; and
an elongated pin;
wherein the shackle body comprises a flexible elongated member formed using at least one length of rope circuitously wound and formed into a loop to define a plurality of rope sections, the flexible elongated member comprising a first notional section and a second notional section, a first parting is formed at the first notional section and a second parting is formed at the second notional section, the first parting and second parting are spaced apart from each other and are each preferably formed by separating at least a portion of at least one rope section from a portion of the other of the rope sections, wherein a first end noose portion eye is formed by passing at least a part of the first notional section through the first parting, and a second end noose portion eye is formed by passing at least a part of the second notional section through the second parting, and
wherein the elongated pin is configured to engage or is engaged with the shackle body by passing the pin through both the first end noose portion eye and the second end noose portion eye.

Preferably, the first end noose portion eye is formed by looping the first notional section and running it back through itself such that the first notional section passes through the first parting, and the second end noose portion eye is formed by looping the second notional section and running it back through itself such that the second notional section passes through the second parting.

Preferably, the pin is an elongated pin.

Preferably, the pin is part of a pin assembly, the pin assembly further comprising a clamping member that is configured to move between a clamped position and an unclamped position, wherein when in the clamped position the clamping member is configured to clamp at least one end of the pin thereby facilitating locking and securing of the pin within the first eye and the second eye, and when in when in the unclamped position the clamping member is configured to unclamp the pin thereby allowing release of the pin from the first eye and the second eye.

Preferably, the loop is a continuous loop.

Preferably, the at least one length of rope comprises a continuous integrally formed length of rope or a continuous length of rope formed via end-joining of a plurality of discrete non-continuous lengths of rope.

Preferably, a grooved rim of a first annular member is secured to the first eye and a grooved rim of a second annular member is secured to the second eye and the pin is configured to pass through both the first eye and the second eye by passing through the first annular member and the second annular member respectively.

Preferably, the first annular member is a bobbin or a spool.

Preferably, the second annular member is a bobbin or a spool.

Preferably, the flexible elongate member is at least in part protectively and collectively ensheathed using at least one cover (or a sleeve) to protect at least part of the rope sections.

Preferably, the at least one cover (or the sleeve) is made up of a reflective material or a material that is visible in dark.

Preferably, the at least one cover is made from a material that is durable, stretchable and/or has high resistance against abrasion, tears, scuffs and friction.

Preferably, the at least one cover is be made of a material that is Ultra High Modulus PolyEthylene Fibre, preferably Dyneema®.

Preferably, the at least one cover is a removable cover.

Preferably, the at least one cover comprises hook and loop fasteners for easy removal.

Preferably, the at least one length of rope comprises at least two sections of rope.

Preferably, the at least one length of rope consists of one length of rope formed to define parallel multiple rope sections of the length of rope of the flexible elongate member.

Preferably, the at least one length of rope is of an Ultra-high molecular weight polyethylene.

Preferably, the at least one length of rope is selected from one of Technora®, Kevlar®, Dyneema® and/or Spectra®.

Preferably, the multiple rope sections or at least the portion of the multiple rope sections are braided to each other.

Preferably, the multiple rope sections are parallel to each other.

Preferably, the flexible elongate member comprises of at least 3 parallel rope sections of the least one length of rope.

Preferably, the multiple rope sections comprises of least 4, 6, or 8 parallel rope sections of the least one length of rope.

Preferably, at least some of the rope sections are of different to least one other rope section.

Preferably, the total weight of the shackle is between 6 kg and 60 kg.

Preferably, the total weight of the shackle is less than 30.9 kg.

Preferably, the total weight of the shackle is less than 20 kg.

Preferably, the total weight of the shackle is less than 15 kg.

Preferably, the total weight of the shackle is less than 10 kg.

Preferably, the total weight of the shackle is less than 10.5 kg.

Preferably, the total weight of the shackle is 8 kg or approximately 8 kg, more preferably 8.2 kg.

Preferably, the total weight of the shackle is more than 7 kg.

Preferably, the flexible elongate member has a total diameter greater than 50 cm.

Preferably, the flexible elongate member has a total diameter between 52 cm-62 cm.

Preferably, the flexible elongate member has a total diameter of less than 65 cm.

Preferably, the at least one length of rope has a total diameter between 10 to 15 cm, more preferably between 13 cm to 15 cm.

Preferably, the shackle is designed to be loaded to a load limit of at least 20,000 kg.

Preferably, the shackle is designed to be loaded to a load limit of at least 180,000 kg.

Preferably, the shackle is designed to be loaded to a load limit of at least 280,000 kg.

Preferably, the shackle is designed to be loaded to a load limit of at least 500,000 kg.

Preferably, the shackle is designed to be loaded to a load limit of less than 600,000 kg.

Preferably, the maximum stretch of the shackle is between about 0.5 to 1 percent.

Preferably, the maximum stretch of the shackle when loaded to a load limit is between about 0.5 to 1 percent.

Preferably, when loaded to a load limit, the maximum stretch of the shackle at failure is between about 0.5 to 1 percent.

Preferably, the shackle may exhibit between about 0.5 to 1% elongation at MBS.

Preferably, the shackle may exhibit between about 0.5 to 1% elongation at work load limit (WLL).

Preferably, the shackle may exhibit less than 1% elongation at work load limit (WLL).

Preferably, the shackle may exhibit less than 0.5% elongation at work load limit (WLL).

Preferably, the shackle may exhibit no more than 0.5 to 1% elongation at work load limit (WLL).

Preferably, the maximum stretch of the shackle may be less than 1% at work load limit (WLL).

Preferably, the maximum stretch of the shackle may be less than 0.5% at work load limit (WLL).

Preferably, the maximum stretch of the shackle may be no greater than 0.5 to 1% at work load limit (WLL).

Preferably, the maximum stretch of the shackle is 20 percent when coupled to a load of more than 100,000 kg.

Preferably, the maximum stretch of the shackle is 19 mm when coupled to a load of 175,000 kg.

Preferably, the at least one length of rope is wound into the loop by a plurality of windings or laps of the at least one length of rope.

Preferably, the windings or laps are of at least two different sizes.

Preferably, the inner windings are all of the same length.

Preferably, the outer windings are all of the same length.

Preferably, the outer windings are longer than the inner windings.

Preferably, the rope is wound in a manner to abut itself along its length as a plurality of windings.

Preferably, the length(s) of rope is wound onto itself.

Preferably, the length of rope is wound onto itself to present parallel sections of rope.

Preferably, the shackle is a soft shackle.

Preferably, the shackle is configured to be used in lifting, rigging, towing, slinging, pulling and/or securing a load in a mining industry.

Preferably, the shackle is configured for use in vehicle recovery operations.

Preferably, the end noose portions together define a bow of the shackle.

Preferably, the end noose portions together define a bow of the shackle through which, in use, a shackle pin may be configured to extend through.

Preferably, the pin, when used with the shackle body, is configured to extend through the bow such that a tightening of said bow promotes a contraction of the bow about said shackle pin and a corresponding coupling of the shackle pin to the shackle body.

Preferably, the bow of the shackle is configured to elastically deform based on a contraction or extension of the intermediate noose portion and/or a tightening or loosening of the end noose portions.

Preferably, the bow of the shackle is configured to extend or contract proportionally with a contraction or extension of the flexible elongate member.

Preferably, the rope section(s) of the flexible elongate member, at the end noose portions, is/are oriented perpendicular, transverse, right-angled or about 90 degrees relative a longitudinal axis or length of a shackle pin when in use.

Preferably, the rope section(s) of the flexible elongate member, at the intermediate noose portion, is/are oriented perpendicular, transverse, right-angled or about 90 degrees relative a longitudinal axis or length of a lifting or movement member, such as a hook, when in use.

Preferably, the rope section(s) of the flexible elongate member, at the end noose portions, is/are oriented perpendicular, transverse, right-angled or about 90 degrees relative the rope section(s) of the flexible elongate member, at the intermediate noose portion.

Preferably, the flexible elongate member is configured such that its rope section(s), when in use, is/are oriented at the intermediate noose portion and/or end noose portions in a manner so as to present a maximum surface area for contact with a lifting or movement member such as a hook and/or a shackle pin, respectively.

One of more statements above relating to the seventh aspect may also apply to any one or more of the first, second, third, fourth, fifth, sixth and eight aspects.

In an eighth aspect, the invention resides in a coupling device comprising a flexible elongate member of at least one length of rope at least twice wound to form a loop and a pin engaged or configured to be to be removably and/or moveably engaged with the flexible elongate member, wherein a first parting is formed in the flexible elongate member and a second parting is formed in the flexible elongate member at a location away from the first parting, the flexible elongate member passing through itself at each of the first parting and second parting to create a first eye to one side of the first parting opposite the second parting and a second eye to one side of the second parting opposite the first parting.

Preferably, the first parting and second parting are spaced apart from each other and each formed by separating the rope windings.

Preferably, at least one winding of rope is of a different length to at least one other winding.

Preferably, the coupling device is a shackle.

Preferably, the coupling device comprises a pin that is configured to engage with the elongate member by passing the pin through both the first eye and the second eye.

Preferably, the end noose portions together define a bow of the shackle.

Preferably, the end noose portions together define a bow of the shackle through which, in use, a shackle pin may be configured to extend through.

Preferably, the pin, when used with the shackle body, is configured to extend through the bow such that a tightening of said bow promotes a contraction of the bow about said shackle pin and a corresponding coupling of the shackle pin to the shackle body.

Preferably, the bow of the shackle is configured to elastically deform based on a contraction or extension of the intermediate noose portion and/or a tightening or loosening of the end noose portions.

Preferably, the bow of the shackle is configured to extend or contract proportionally with a contraction or extension of the flexible elongate member.

In a ninth aspect, the invention resides in a shackle comprising: a shackle body for use with a shackle pin, the shackle body comprising: a flexible elongate member comprising at least one length of rope circuitously formed so that the flexible elongate member passes through itself and defines three sequentially adjacent noose portions, wherein the three sequentially adjacent noose portions comprise (e.g., formed as or being or has) an intermediate noose portion and two end noose portions at opposing ends of the shackle body, the two end noose portions defining a bow of the shackle.

Preferably, a contraction or extension of the intermediate noose portion causes a movement of said length of rope through where the elongate member passes through itself, thereby effecting a proportional tightening or loosening of the bow of the shackle.

Preferably, the shackle pin, when used with the shackle body, is configured to extend through the bow such that a tightening of said end noose portions promotes a contraction of said bow about the shackle pin and a corresponding coupling of the shackle pin to the shackle body.

Preferably, the rope section(s) of the flexible elongate member, at the end noose portions, is/are oriented perpendicular, transverse, right-angled or about 90 degrees relative a longitudinal axis or length of a shackle pin when in use.

Preferably, the rope section(s) of the flexible elongate member, at the intermediate noose portion, is/are oriented perpendicular, transverse, right-angled or about 90 degrees relative a longitudinal axis or length of a lifting or movement member, such as a hook, when in use.

Preferably, the rope section(s) of the flexible elongate member, at the end noose portions, is/are oriented perpendicular, transverse, right-angled or about 90 degrees relative the rope section(s) of the flexible elongate member, at the intermediate noose portion.

Preferably, the flexible elongate member is configured such that its rope section(s), when in use, is/are oriented at the intermediate noose portion and/or end noose portions in a manner so as to present a maximum surface area for contact with a lifting or movement member such as a hook and/or a shackle pin, respectively.

In a tenth aspect, the invention resides in a shackle comprising: a shackle body for use with a shackle pin, the shackle body comprising: a flexible elongate member comprising at least one length of rope circuitously formed so as to define a continuous endless circuit such that the flexible elongate member passes through itself at two intersections of itself and defines three sequentially adjacent noose portions comprising (e.g. are formed as or being or having) an intermediate noose portion and two end noose portions at opposing ends of the shackle body, wherein: (i) a first intersection of the two intersections defines a transition of the flexible elongate member from the intermediate noose portion to a first end noose portion of the two end noose portions, and a second intersection of the two intersections defines a transition of the flexible elongate member from the intermediate noose portion to a second end noose portion of the two end noose portions, and (ii) a contraction or extension of the intermediate noose portion causes a movement of said length of rope through the two intersections, thereby effecting a proportional tightening or loosening of one or each of said end noose portions such that when the shackle pin is used with the shackle, and extends through eyes defined by the end noose portions, a tightening of said end noose portions promotes a contraction of said eyes about said shackle pin and a corresponding coupling of the shackle pin to the shackle body.

In an eleventh aspect, the invention resides in a shackle comprising: a shackle body for use with a shackle pin, the shackle body comprising: a flexible elongate member comprising at least one length of rope circuitously formed so as to define a continuous endless circuit such that the flexible elongate member passes through itself at two intersections of itself and defines three sequentially adjacent noose portions comprising (e.g., are formed as or being or having) an intermediate noose portion and two end noose portions at opposing ends of the shackle body, the at least one length of rope comprising a plurality of rope sections of said length of rope arranged in a coplanar, parallel, near-adjacent and/or near-contiguous arrangement relative one another, wherein:

(i) a first intersection of the two intersections defines a transition of the flexible elongate member from the intermediate noose portion to a first end noose portion of the two end noose portions, and a second intersection of the two intersections defines a transition of the flexible elongate member from the intermediate noose portion to a second end noose portion of the two end noose portions, and (ii) a contraction or extension of the intermediate noose portion causes a movement of said length of rope through the two intersections, thereby effecting a proportional tightening or loosening of one or each of said end noose portions such that when the shackle pin is used with the shackle, and extends through eyes defined by the end noose portions, a tightening of said end noose portions promotes a contraction of said eyes about said shackle pin and a corresponding coupling of the shackle pin to the shackle body.

Preferably, the plurality of rope sections of said length of rope comprise four rope sections arranged in a stacked arrangement of a first pair of the rope sections atop a second pair of the rope sections, both rope sections of each of the first and second pair arranged in a coplanar, parallel, near-adjacent and/or near-contiguous arrangement relative one another.

Preferably, the four rope sections, at the intermediate noose portion, are oriented perpendicular, transverse, right-angled or about 90 degrees relative a lifting or movement member when in use extending through an eye of the intermediate noose portion.

Preferably, the four rope sections, at the end noose portions, are oriented perpendicular, transverse, right-angled or about 90 degrees relative the shackle pin when in use extending through eyes of the end noose portions.

Preferably, the elongate member is configured such that a lower-most pair of the four rope sections, at the intermediate noose portion, are oriented so as to present a maximum surface area for contact with a lifting or movement member when in use extending through an eye of the intermediate noose portion.

Preferably, the elongate member is configured such that an upper-most pair of the four rope sections, at the end noose portions, are oriented so as to present a maximum surface area for contact with the shackle pin when in use extending through eyes of the end noose portions.

One of more statements above relating to the first aspect may also apply to any one or more of the second, third, fourth, fifth, sixth, seventh, eighth, ninth, tenth or eleventh aspects.

In a twelfth aspect, the invention resides in a method of using a shackle or the coupling device as defined in any one of the above statements, the method comprising:
    providing the shackle or the coupling device comprising a main piece (i.e. shackle body) and a shackle pin;
    attaching the shackle pin to the main piece so that the first and second eyes both receive the shackle pin therethrough, thereby allowing the shackle pin to function as a cross member to the main piece (shackle body).

Preferably, the method further comprises coupling the shackle body and/or shackle pin to one or more apparatus that is/are to be coupled by the coupling device prior to attaching the shackle pin to the main piece.

One of more statements above relating to the first, second, third, fourth, fifth, sixth, seventh, eighth, ninth, tenth or eleventh aspects may also apply to the twelfth aspect.

In a thirteenth aspect, the invention resides in a method of making a shackle body, the method comprising:
    providing a flexible elongated member comprising of at least one length of rope defined by multiple rope sections that is formed as a loop comprising a first notional section and a second notional section,
    forming a first parting at the first notional section and a second parting at the second notional section by splitting the rope sections, the first parting and second parting are spaced apart from each other and are each formed by splitting the rope sections,
    forming a first eye by passing at least a part of the first notional section through the first parting,
    forming a second eye by passing at least a part of the second notional section through the second parting.

Preferably, the method comprises, forming at least one of the first eye and second eye as a noose.

Preferably, the method further comprises forming the first eye as a first noose and a second eye as a second noose.

Preferably, the method further comprises attaching a pin to the shackle body so that the first and second eyes each function as a pin receiving aperture configured to receive the pin therethrough, thereby allowing the pin to function as a cross member to the body.

One of more statements above relating to the first, second, third, fourth, fifth, sixth, seventh, eighth, ninth, tenth, eleventh and twelfth aspects may also apply to the thirteenth aspect.

In a fourteenth aspect, the invention resides in a method of making a shackle body, the method comprising:
    providing a flexible elongated member comprising of at least one length of rope defined by multiple rope sections that is formed as a loop comprising a first notional section and a second notional section,
    forming a first parting at the first notional section and a second parting at the second notional section by splitting the rope sections, the first split and second split are spaced apart from each other and are each formed by splitting the rope sections,
    forming a first eye by looping the first notional section and running it back through itself such that the first notional section passes through the first parting,
    forming a second eye by looping the second notional section and running it back through itself such that the second notional section passes through the second parting.

Preferably, the shackle body is formed from a lay flat shape of the triple infinity loop by bending the lay flat shape at the intermediate noose portion to bring the end noose portions adjacent each other.

Preferably, the shackle body is formed from a lay flat shape of the triple infinity loop by bending the lay flat shape at the intermediate noose portion to bring the end noose portions into alignment with each other to allow the shackle pin to pass through both end noose portions.

Preferably, the shackle body is formed from a lay flat shape precursor by bending the lay flat shape at the intermediate noose portion to bring the end noose portions adjacent each other.

Preferably, the shackle body is formed from a lay flat shape precursor by bending the lay flat shape at the intermediate noose portion to bring the end noose portions into alignment with each other to allow the shackle pin to pass through both end noose portions.

Preferably, the bending is through 180 degrees.

Preferably, the shackle body is formed to a shape where the intermediate noose portion has a bend bringing the end noose portions adjacent each other.

Preferably, the shackle body is formed to a shape where the intermediate noose portion has a bend to bring the end noose portions into alignment with each other to allow the shackle pin to pass through both end noose portions.

Preferably, the shackle body is formed to a shape where the intermediate noose portion has a bend to bring the end noose portions into alignment with each other with the shackle pin passing through both end noose portions.

Preferably, the flexible elongate section is formed from a lay flat shape of the triple infinity loop by bending the lay flat shape at the intermediate noose portion to bring the end noose portions adjacent each other.

Preferably, the flexible elongate section is formed from a lay flat shape of the triple infinity loop by bending the lay flat shape at the intermediate noose portion to bring the end noose portions into alignment with each other to allow the shackle pin to pass through both end noose portions.

Preferably, the flexible elongate section is formed from a lay flat shape precursor by bending the lay flat shape at the intermediate noose portion to bring the end noose portions adjacent each other.

Preferably, the flexible elongate section is formed from a lay flat shape precursor by bending the lay flat shape at the intermediate noose portion to bring the end noose portions into alignment with each other to allow the shackle pin to pass through both end noose portions.

Preferably, the bending is through 180 degrees.

Preferably, the flexible elongate section is formed to a shape where the intermediate noose portion has a bend bring the end noose portions adjacent each other.

Preferably, the flexible elongate section is formed to a shape where the intermediate noose portion has a bend to bring the end noose portions into alignment with each other to allow the shackle pin to pass through both end noose portions.

Preferably, the flexible elongate section is formed to a shape where the intermediate noose portion has a bend to bring the end noose portions into alignment with each other with the shackle pin passing through both end noose portions.

One of more statements above relating to the first, second third, fourth, fifth, sixth, seventh, eighth, ninth, tenth, eleventh, twelfth and thirteenth aspects may also apply to the fourteenth aspect.

In a further aspect the present invention may be said to be a coupling device as substantially herein described with reference to one of more of the accompanying drawings and/or depicted in one or more of the accompanying drawings.

In the above, one or more statements relating to one aspect may equally apply to another aspect.

Other aspects of the invention may become apparent from the following description which is given by way of example only and with reference to the accompanying drawings.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings and described in the following description are simply exemplary embodiments of the invention. Hence, specific dimensions and other physical characteristics related to the embodiments disclosed herein are not to be considered as limiting.

It is acknowledged that the term "comprise" may, under varying jurisdictions, be attributed with either an exclusive or an inclusive meaning. For the purpose of this specification, and unless otherwise noted, the term 'comprise' shall have an inclusive meaning, allowing for inclusion of not only the listed components or elements, but also other non-specified components or elements. The terms 'comprises' or 'comprised' or 'comprising' have a similar meaning when used in relation to the system or to one or more steps in a method or process.

Unless specifically stated otherwise, in this specification, use of the word 'substantially' with a term, to define a characterizing feature(s), gets all the benefit (i.e. benefit of any broadening) afforded by the use of the word 'substantially', and also includes within its scope the feature(s) being that term exactly, (without broadening). For example, if a feature is described/defined in the present specification as being 'substantially vertical' then that includes, within its scope, the feature being 'close' to vertical (in so far the word 'substantially' is deemed to broaden the term 'vertical'), and also includes within its scope the feature being 'exactly' vertical.

As used hereinbefore and hereinafter, the term "and/or" means "and" or "or", or both.

As used hereinbefore and hereinafter, "(s)" following a noun means the plural and/or singular forms of the noun.

When used in the claims and unless stated otherwise, the word 'for' is to be interpreted to mean only 'suitable for', and not for example, specifically 'adapted' or 'configured' for the purpose that is stated.

Unless otherwise specifically stated, the word "rope" as used may include both single strand and multiple strands rope where the or each strand is made up of multiple fibres/filaments of non-metallic material(s). The word "ropes" refer to more than one rope.

BRIEF DESCRIPTION OF THE DRAWINGS

Preferred embodiments of the invention will be described by way of example only and with reference to the drawings, in which:

FIG. 6A-E: shows the steps in a process of how the rope may be formed into the desired configuration.

FIG. 10A: shows a perspective view of an embodiment holding members and support windings wrapped about an embodiment elongate member;

FIG. 10B: shows a perspective view of an elastic sheath arrangement wrapped about an embodiment elongate member;

FIG. 11A: shows a perspective view of an embodiment hook guard;

FIG. 11B: shows a perspective view of the embodiment hook guard of FIG. 11A placed in use with an embodiment shackle.

DETAILED DESCRIPTION

The shackle of the present invention may be suitable for coupling directly or indirectly to at least one apparatus or equipment. The apparatus or equipment may be heavy machinery items, mobile equipment such as a bulldozer, truck or trailer. The apparatus or equipment may be used on land, in the ocean or in the air. The shackle 100 may be used for lifting, lowering, towing, dragging, slinging and securing loads. The shackle 100 can be used in mines and on building construction sites for example.

Figure 1:
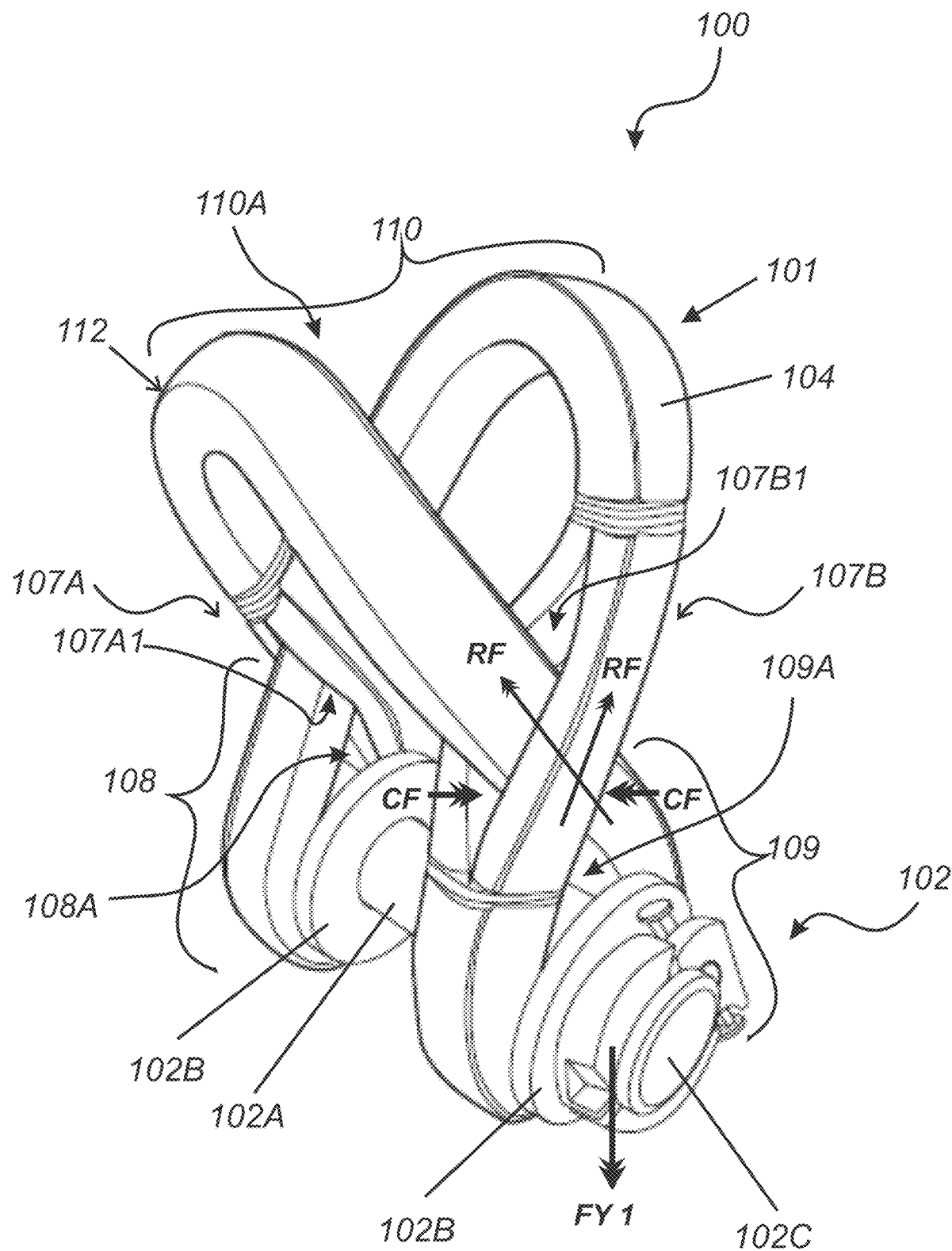
FIG. 1: shows a perspective view of one example of a shackle according to one embodiment of the present invention.

Reference will first be made to FIG. 1 that shows one preferred example of a shackle 100 according one form of the present invention.

The shackle 100 comprises a shackle body 101. The shackle 100 may also comprise of a shackle pin 102 for use with the shackle body 101.

The shackle body 101 comprises a flexible elongate member 104. The flexible elongate member 104 preferably comprises of a length of rope that is configured in a shape that defines at least a substantial part of the flexible elongate member 104. The flexible elongate member 104 preferably comprises of at least one length of rope 114 although it is envisaged that such one length may be made up of a plurality of end-spliced shorter rope portions. These shorter portions may be end spliced either prior to or during the formation of said elongate member 104 into its shape as hereinafter described.

The length of rope 114 is preferably spliced end-to-end to itself so at to make it endless in that it has no free-ends. It hence preferably defines a closed loop or continuous circuit. In some embodiments the length of rope 114 is circuitously configured into one, two, four, six, or eight coplanar, parallel, near-adjacent and/or near-contiguous sections of said rope 114, as will hereinafter be described. The number of sections of said 114 may be selected depending on the required break load of a given shackle 100 embodiment.

FIG. 1 shows that the flexible elongate member 104 of the shackle body 101 comprises generally of two end noose portions 108, 109. The first end noose portion 108 and second end noose portion 109 are at opposing ends of the flexible elongate member 104 and an intermediate noose portion 110 is located therebetween.

The first and second noose portions 108, 109 generally each take an enclosed form respectively defining first and second eyes 108A, 109A therein. Similarly, the intermediate noose portion 110 also takes an enclosed form defining an intermediate eye 110A therein. In this way, the eyes 108A, 109A, 110A may be defined as rope-enclosed regions of the elongate member 104.

The sequentially adjacent noose portions 108, 109, 110 are generally integrally formed from a continuous, endless looped form of the elongate member 104. These noose portions 108, 109, 110 are distinct from each other by virtue of the elongate member crossing itself at the first and second intersections 107A, 107B where "twists" between each noose portion reside. The first intersection 107A of the two intersections may thereby define a transition of the flexible elongate member 104 from the intermediate noose portion 110 to the first end noose portion 108, and the second intersection 107B of the two intersections may thereby define a transition of the flexible elongate member 104 from the intermediate noose portion 110 to the second end noose portion 109.

At these intersections the elongate member 104 passes through itself to capture to itself thereat. This can be achieved by virtue of the flexible elongate member having a first and second splits or partings 107A1, 107B1 at the first and second intersections 107A, 107B which the flexible elongate member can pass. Preferably at each of at the first and second intersections 107A, 107B there is one split or parting of the flexible elongate member but it is envisaged there can be more than one split or parting through each of which the flexible elongate member 104 passes through itself. The flexible elongate member 104 may thus be described as comprising at least one length of rope 114 circuitously formed so that the flexible elongate member 104 passes through itself and defines three sequentially adjacent noose portions 108, 109, 110.

In this manner, changes or movements in part of the shackle body 101 will generally affect corresponding or proportional changes in other parts thereof. For example, a contraction or extension of the intermediate noose portion 110 (or tightening or loosening of the intermediate noose portion 110) effects a proportional tightening or loosening of one of both of the end noose portions 108, 109.

It should be noted that noose portions 108, 109, 110 are only generally indicated in FIG. 1. Thus, a movement, contraction, extension etc. of any part of any one of the noose portion(s) 108, 109, 110 will generally effect changes in the configuration of the other noose portion(s) 108, 109, 110, as will be appreciated when viewing FIG. 1 and the continuous endless loop of the elongate member 104 forming the noose portions 108, 109, 110.

The end noose portions 108, 109 are, when the shackle is in use, located to the shackle pin 102. The shackle pin 102 may pass through the end noose portions 108, 109. In particular, the shackle pin 102 may be configured to engage with the shackle body 101 by passing it through both the first eye 108A and the second eye 109A of the respective first and second end noose portions 108, 109.

In some embodiments, the end noose portions 108, 109 may together define a bow of the shackle, where in use, a shackle pin 102 may be configured to extend through the bow.

Additionally or alternatively, the end noose portions 108, 109 may simply be described as a bow.

It will be appreciated how the elastic contraction or extension (and corresponding tightening or loosening) of the end noose portions 108, 109 may hence define a contraction or extension of the bow.

When the shackle 100 is in use (e.g. in the substantially vertical orientation of FIG. 1), the shackle pin 102 may impart a downward weight load of lifted material(s) onto the end noose portions 108, 109, (in the direction indicated by arrow FY1 in FIG. 1) causing a upward response of substantially vertical forces through the elongate member 104 (indicated by arrows RF in FIG. 1), and thus a substantially vertical extension of the shackle body 101 as a whole.

This in turn creates an extension in particular of the intermediate noose portion 110 (as it stretches/extends vertically), which in turn creates a proportional contraction response of the end noose portions 108, 109 (indicated by arrows CF in FIG. 1), or the bow, of the shackle.

Thus, parts of the elongate member 104 that pass through the intersections 107A, 107B extend vertically (due to upward response substantially vertical forces RF), the intersections 'move' 'inward' (due to contraction responses CF) such that the notional diameters or peripheral lengths of the first and second eye 108A, 109A are encouraged to become smaller. This can cause a tightening of one or both of the end noose portions 108, 109 onto the pin 102, this may help to secure the load.

In this manner, the shackle 100 described herein may be described as 'self-tightening' or 'self-actioning' in that imparting a weight load thereon causes a proportional or an automatic tightening/contraction response of one or both of the end noose portions 108, 109 onto the pin 102.

In this manner, the pin 102, when used with the shackle body, is configured to extend through the bow such that a tightening of said bow promotes a contraction of the bow about said shackle pin 102 and a corresponding coupling of the shackle pin 102 to the shackle body.

This contraction of the first and second eyes 108A, 109A of the end noose portions 108, 109 about/around the pin 102 may be described as a coupling condition of the shackle 100, in which the shackle body 101 can function to transfer forces between two objects (i.e., of a lifted object via the pin 102, and of a lifting or movement member i.e., a crane hook, employing the shackle body 101).

Figure 9:
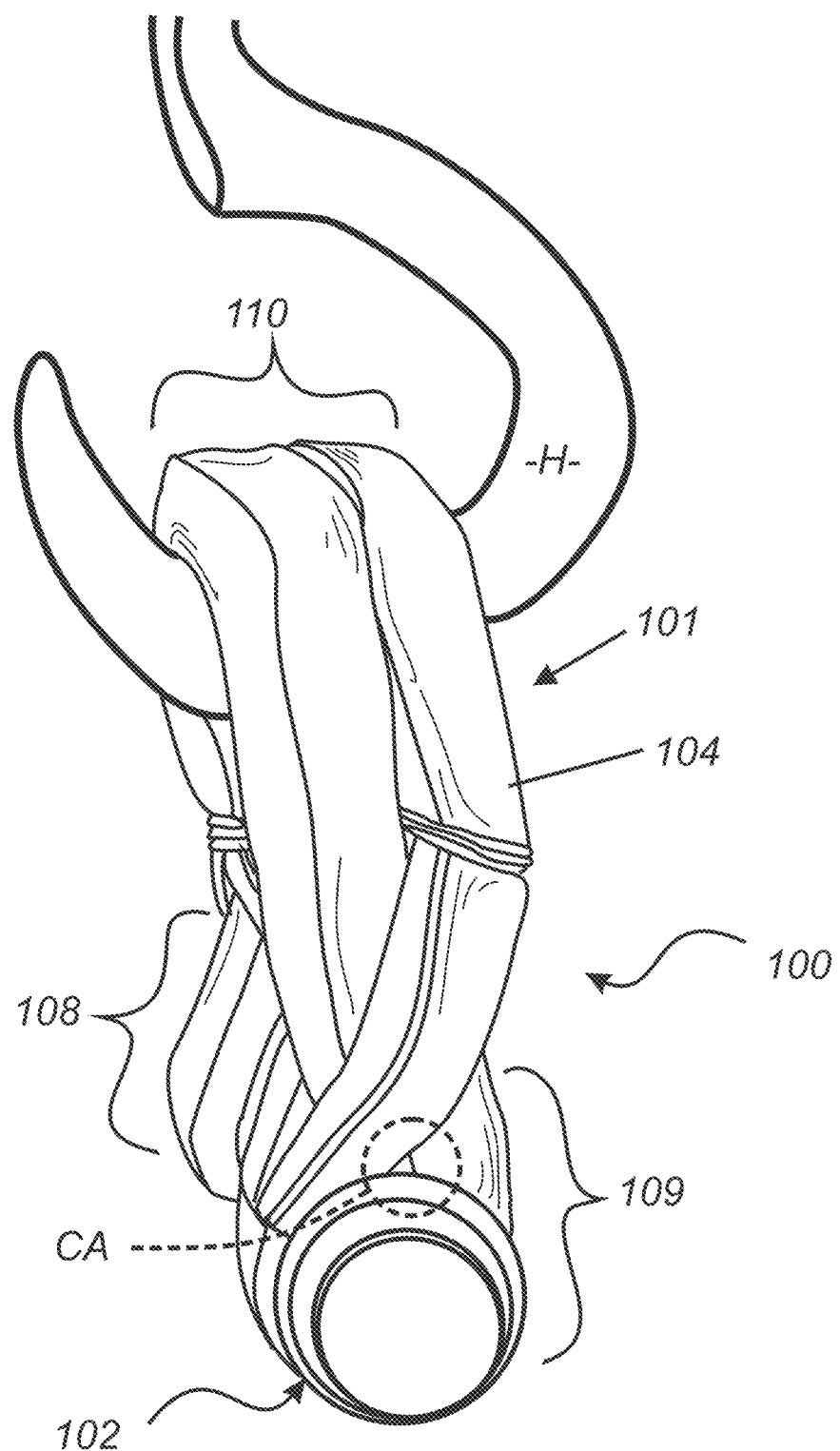
FIG. 9: shows a perspective view of a shackle, according to one embodiment of the present invention, lifted by a hook and in a coupled state with a shackle pin.

This is shown in FIG. 9 where a hook H (such as a crane hook, for example) is shown having hung or lifted the shackle body 101 by passage of the hook H through the intermediate noose portion eye 110A, and where a shackle pin 102 is shown extending through both first and second eyes 108A, 109A of the end noose portions 108, 109. Here, it can be seen that due to the upward lifting force of the crane hook H (i.e., the forces RF of FIG. 1), the intersections 107A, 107B 'move' 'inward' (i.e., due to contraction responses CF of FIG. 1) such that the notional diameters of the first and second eye 108A, 109A are encouraged to become smaller.

Clearance area CA of FIG. 9 indicates much smaller notional diameters of said first and second eyes 108A, 109A when compared to the more visible first and second eyes 108A, 109A of FIG. 1, thus indicating the effective tightening of the shackle body 101 about/around the shackle pin 102, and thus a coupling thereof to the pin 102.

It can be appreciated, that this arrangement of the end noose portions 108, 109 about the pin, has several advantages. With such an arrangement, it is ensured that the first and second eyes 108A, 109A are tightly located about the pin 102 to help prevent its escape from the end noose portions 108, 109. Further, due to the 'self-tightening' or 'self-actioning' nature of the shackle body 101, there may be no need to use tape or additional tying mechanisms (e.g. winding ropes) or other bonding means to ensure that the eyes 108A, 109A do not unintentionally expand in size and becoming prone to coming off the pin. This thereby helps prevent the pin 102 from loosening and/or falling from the end noose portions 108, 109.

However, in some embodiments additional winding ropes may optionally be provided proximate the eyes 108A, 109A (i.e., at intersections 107A, 107B). Example(s) of such are described below in relation to FIG. 10A.

The pin 102 may be an elongated pin which may be of a metallic material(s) such as aluminium, stainless steel, steel, iron etc. However, many suitable non-metallic materials may also be used and the pin may equally be made up of suitable non-metallic materials such as a carbon composite material.

The pin 102 may further define a pin assembly, where in addition to the pin body itself 102A, the pin assembly may further comprise a clamping member 102C that is configured to move between a clamped position and an unclamped position. When in the clamped position the clamping member 102C may be configured to clamp at least one end of the pin body 102A thereby facilitating securing of the pin assembly 102 within the first eye 108A and the second eye 109A.

When in the unclamped position the clamping member 102C may be configured to unclamp the pin body 102A (i.e. at least one end of the pin body 102A) thereby allowing release of the pin body 102A from the first eye 108A and optionally also from the second eye 109A. Therefore, it can be appreciated that the pin body 102A may be configured to be used together with a clamp that is configured to move between a clamped position to lock the pin body 102A within the first eye 108A and the second eye 109A, and an unclamped position to release the pin body 102A from the first eye 108A and the second eye 109A.

Such arrangement is advantageous as it can eliminate the need for a threaded nut or like fastener, and can be used without needing any external tools. However, in an alternative form such a threaded nut or fastener arrangement may be used.

The clamping member 102C may be same or substantially similar to a split flange or nut assembly and the pin body 102A may be the same or substantially similar to the pin or the bolt as described in US Patent Application No. 2017/0089382, the entirety of which is herein incorporated by reference.

The pin body 102A and pin assembly 102 may optionally be of the type as described in WO 2020/245771, the entirety of which is herein incorporated by reference.

Alternatively, no such nut or clamp may be used.

Figure 5B:
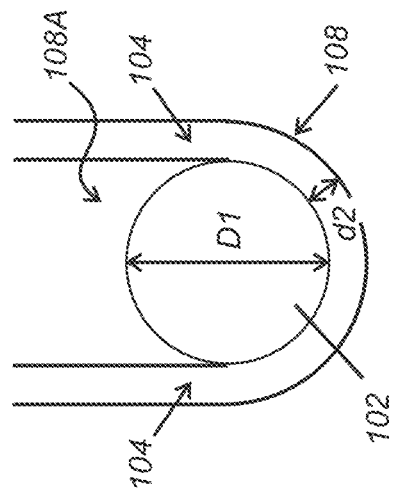
FIG. 5B: shows a perspective view of an example type of the type of rope that can be used.
Figure 5C:
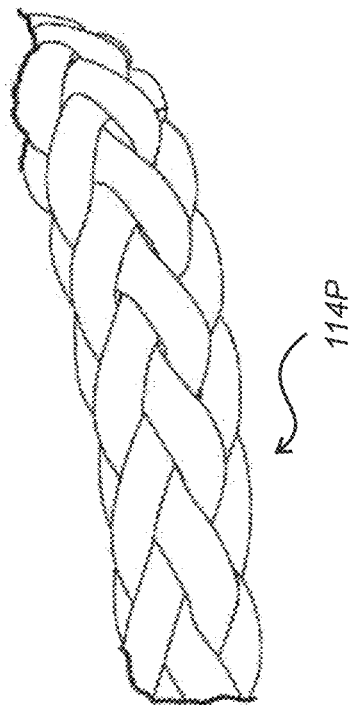
FIG. 5C: shows a schematic side view of example diameters of a pin and shackle according to one embodiment of the present invention.
Figure 5A:
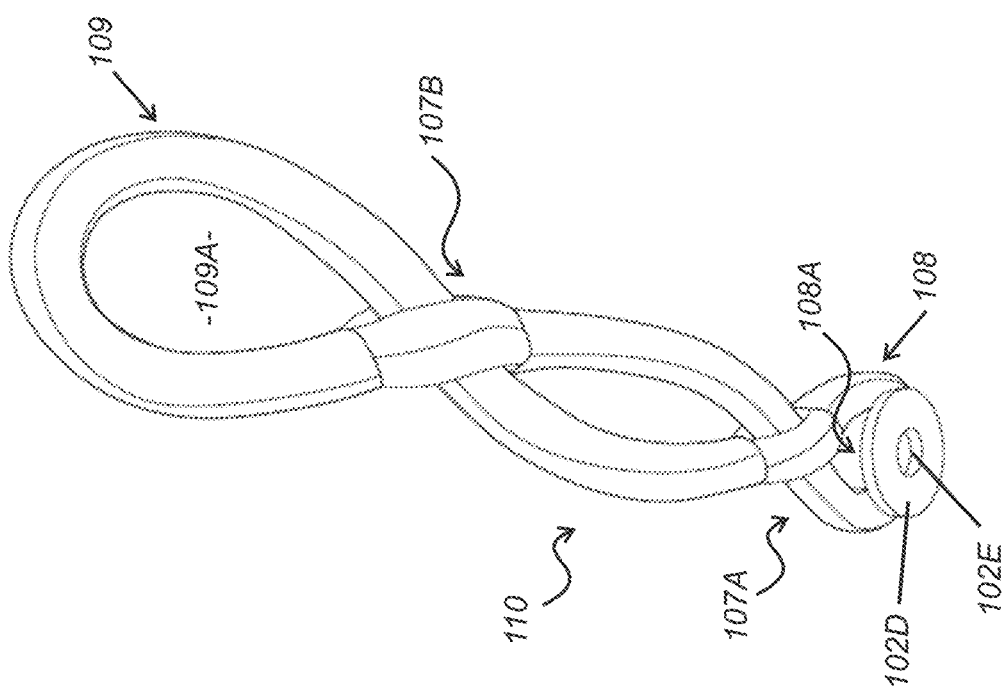
FIG. 5A: shows a perspective view of another example of a shackle according to another embodiment of the present invention.

In some embodiments, the pin assembly may comprise of a grooved rim of a first annular member 102D that may be secured to the first eye 108A of first end noose portion 108 as shown in FIG. 5A. Although, not shown in FIG. 5A, similar grooved rim of a second annular member may be is secured to the second eye 109A of second end noose portion 109. The first eye 108A and second eye 109A are preferably snugly received within the grooved rims of the first and second annular members.

The pin 102 may be configured to pass through both the first and second eyes 108A, 109A by passing through the first annular member 102D and the second annular member respectively. The first and/or second annular members may take the form of a bobbin) or spool. The first annular member 102D may comprise a first pin receiving aperture 102E. The second annular member may also comprise a similar second pin receiving aperture. Such apertures allow the annular member(s) to be assembled and taken off the pin 102 to open the shackle 100 up.

The pin assembly 102 may have its pin body 102A extending along a longitudinal axis and having two ends located opposite to each other. In embodiments where annular members described above are used, the pin body 102A may be configured to be integral with or attached to the annular members so that the first and second pin receiving apertures thereof are both adapted to receive the pin body 102A therethrough, thereby functioning as a cross member.

In one configuration, one of the two ends of the pin body 102A may comprise of a head portion. The head portion may be rotatable to engage to the pin body 102A and to disengage the pin assembly 102 as a whole. In one configuration, head portion may be shaped as a nut.

The pin 102 may otherwise be formed or configured in other ways known in the art of shackle and lifting solutions, depending on a given lifting application. The diameter and length of the pin 106 can be designed according to standard engineering principles and using well known engineering techniques.

Also shown in FIG. 1 is an optional sheath or protective cover 112 at least partially located about discrete parts or the entire length of the flexible elongate member 104. In FIG. 1 the cover 112 wraps substantially around the entire length of the elongate member 104 i.e., around the first end, second end and intermediate noose portions 108, 109, 110. As mentioned above, the flexible elongate member 104 may comprise of a length of rope 114 formed to define one or a plurality of substantially parallel rope sections 114A, 114B, 114C . . . etc. The rope or rope sections 114 are preferably ensheathed collectively at least partially using at least one cover 112.

The cover 112 may be made of a material that is durable. The cover may be configured to be stretchable and/or have high resistance against abrasion, tears, scuffs and friction. The cover 112 may be made of a material that is High or Ultra High Modulus PolyEthylene Fibre, most preferably Dyneema®. Making a cover using such a material provides maximum strength combined with minimum weigh. The cover may be removable e.g. the cover may use hook and loop fasteners 112A (shown in FIG. 2A) such as Velcro® for easy removal. Having a removable cover is advantageous as that allows the inner core or inside of the coupling device to be inspected to ensure that is in safe and suitable condition. Having a removable cover means the cover 112 can easily be replaced if necessary. This allows the shackle 100 to be an easily serviceable item and provide better longevity. Similarly, if the cover 112 experienced chafe or abrasion, it can easily be removed and replaced with a new one. Extreema® protection round slings and/or webbing slings may be used as or to make the cover 112.

In certain embodiments, the cover 112 may not be all removable and only certain areas may be accessible, such as the weight bearing surfaces at/near the end noose portions 108, 109. There may be an additional chafe guard to provide additional resistance against abrasion and chafe.

In some embodiments, the cover 112 is made up of an aramid, more preferably a para-aramid high performance fibre, even more preferably Technora® and/or Kevlar®. This can provide a high heat resistant/chafe tolerance that can be very useful in high heat environment such as a mining environment.

In one embodiment, the cover 112 may be made up a reflective material so that the shackle 100 can be more easily made visible in darkness. This can make the shackle 100 useful in mines where the visibility may be limited.

Figure 2B:
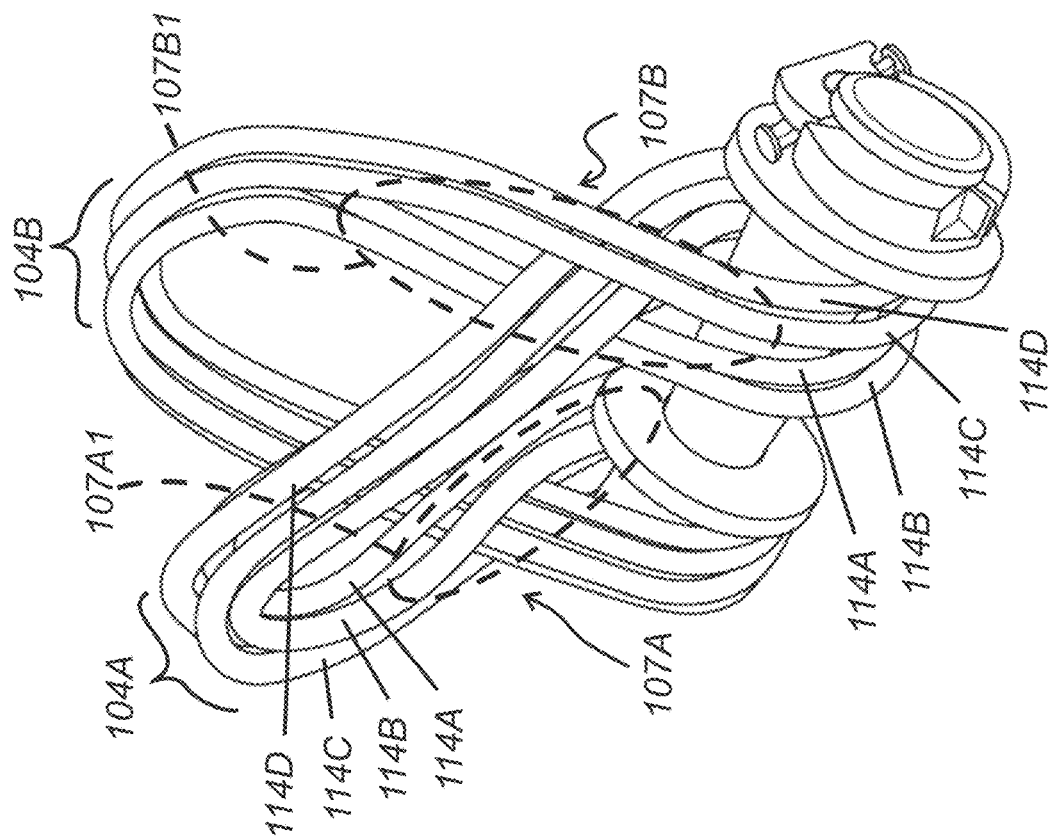
FIG. 2B: shows a perspective view of the shackle of FIG. 1 without a cover or sleeve.
Figure 2A:
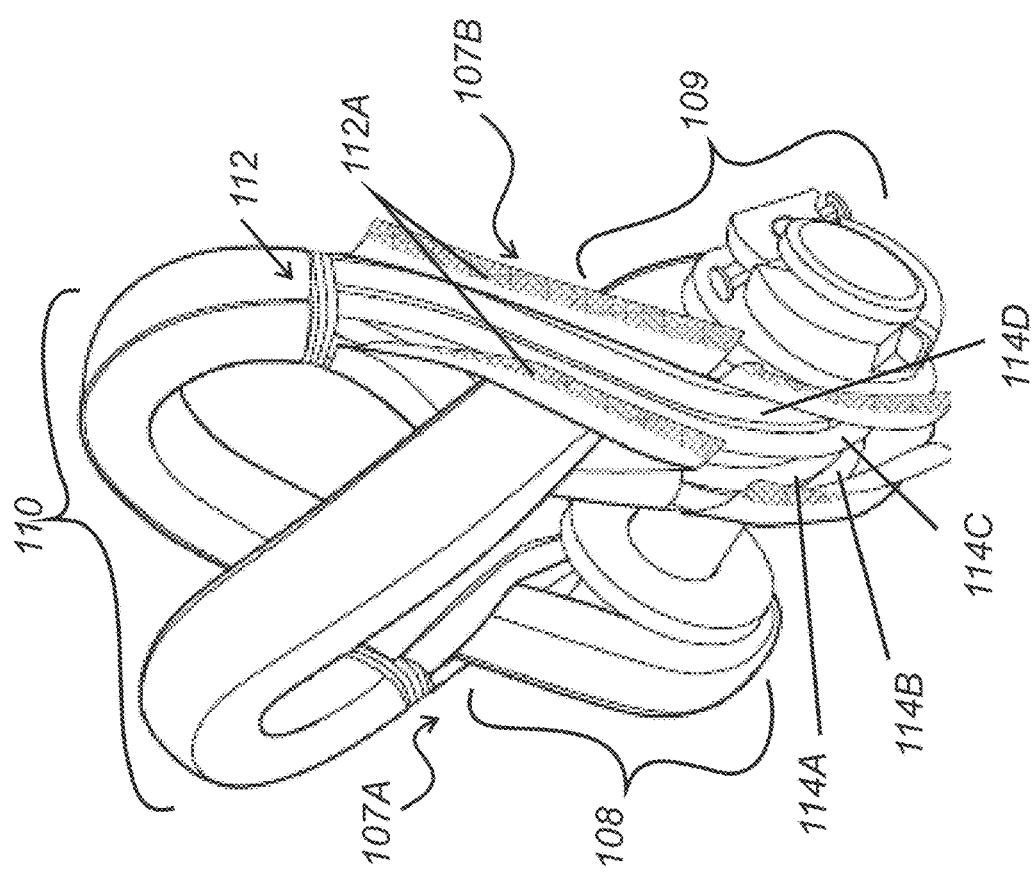
FIG. 2A: shows a perspective view of the shackle of FIG. 1 with a cover or sleeve partially opened to show the multiple rope sections inside.

Turning now to FIG. 2A, the cover 112 is shown at least partly separated around the area of the second intersection 107B and second end noose portion 109. Shown within the cover 112 is the flexible elongate member 104 comprising of a length of rope 114. In the embodiments of FIGS. 2A and 2B, four sections 114A, 114B, 114C, 114D of the length of rope are shown. In FIG. 2B these sections 114A, 114B, 114C, 114D are shown in a non-taught/slack or loose configuration.

Each of these rope sections 114A, 114B, 114C, 114D are configured in multiple parallel contiguous laps of the triple noose shape of the flexible elongate member 104, so as to define the continuous endless loop formation of the elongate member 104. In some embodiments, at least two or more rope sections may be arranged in a coplanar, parallel, near-adjacent and/or near-contiguous arrangement relative one another.

Figure 3:
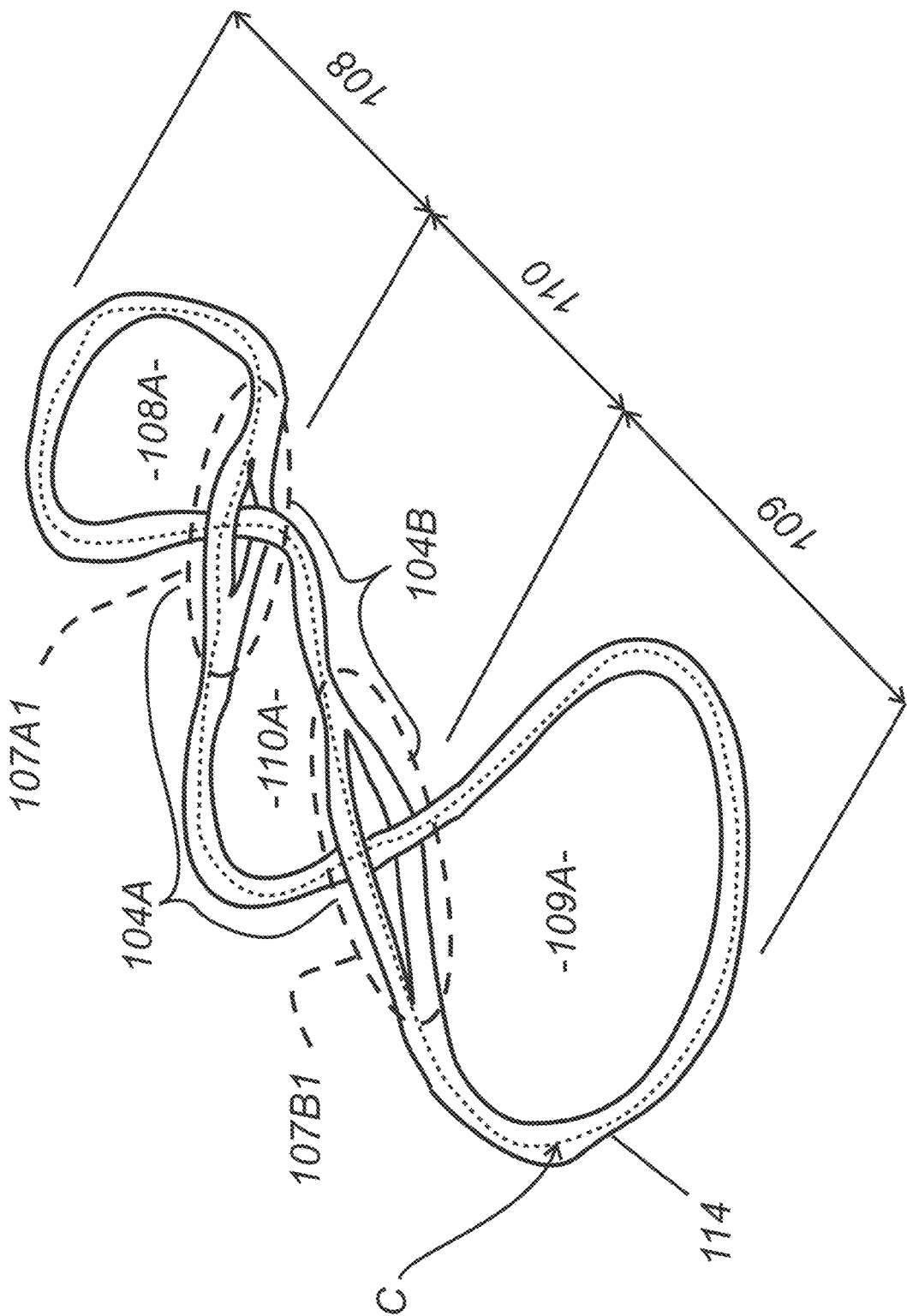
FIG. 3: shows a perspective view of an example single length of rope configured according to one embodiment of the present invention.

However, in a more simplified form as seen in FIG. 3, the elongate member 104 can be formed from rope 114 configured in a single lap about an endless circuit so as to define the continuous endless loop formation of the elongate member 104. In this configuration the elongate member 104 only has one section 114.

When the flexible elongate member 104 comprises of multiple sections 114A, 114B, 114C, 114D etc. these sections 114A, 114B, 114C, 114D are preferably defined by one length of rope 114. In an alternative form this single length of rope 114 is for example formed by multiple end-joined (e.g. spliced) (previously discrete/separate) lengths of rope. If end-joined, the lengths of rope may be of the same kind and size or may not be all of the same kind and/or diameter.

In one example as seen in FIG. 2B at the first intersection 107A, all four sections 114A, 114B, 114C, 114D pass in between/through the first parting 107A1 defined by the parting of a first section 104A of the elongate member 104 (i.e., parting of ropes 114A, 114B from a section of ropes 114C, 114D). Likewise, at the second intersection 107B, all four sections of rope 114A, 114B, 114C, 114D pass in between/through the second parting 107B1 defined by the parting of a second section 104B of the elongate member 104 (i.e., parting of ropes 114C, 114D from a section of ropes 114A, 114B).

In this way, irrespective of the number of sections of rope 114 employed, the shackle body 101 may comprise a single, continuous length of elongate member 104 formed into an endless loop, whereby once formed into the loop, a first section 104A is notionally formed and a second section 104B is notionally formed.

This is shown in FIG. 2B wherein the notional first and second sections 104A, 104B can be understood for illustrative purposes as the two 'ends' or 'parts' 104A, 104B of the elongate member 104 that form/enclose the intermediate noose portion 110 (and/or its eye thereof 110A).

Thus, at the first intersection 107A, there is a first parting 107A1 of the first notional section 104A of the elongate member 104, and at the second intersection 107B, there is also the second parting 107B1 of the second notional section 104B of the elongate member 104.

In this way, the first section 104A of the elongated member 104 passes through the parting 107A1 of the second section 104B, and the second section 104B of the elongate member 104 passes through the parting 107B1 the first section 104A.

It will of course be appreciated that the first and second sections 104A, 104B are notional in the sense that they do not define a physical limit or extremity of the elongate member 104, for instance the first section 104A, after passing through parting 107B1 of the second section 104B, turns around the pin 102 in FIG. 2B before turning back around and forming the parting 107B1 and thus transitioning into the second section 104B, likewise, the second section 104B, after passing through the parting 107A1 of the first section 104A, turns around the pin 102 before turning back around and forming the parting 107A1 and thus transitioning into the first section 104A.

This continuous, endless loop formation of the elongate member 104 means that changes or movements in part of the elongate member 10 will generally affect corresponding or proportional changes in other parts thereof due to its continuity. Thus, as described above, a contraction or extension of the intermediate noose portion 110 effects a proportional tightening or loosening of one or both of the end noose portions 108, 109.

Moreover, when the end noose portions 108, 109 are together defined as a bow of the shackle, it will be appreciated how said bow of the shackle is configured to elastically deform based on a contraction or extension of the intermediate noose portion 110 and/or a tightening or loosening of the end noose portions 108, 109. The bow may hence be configured to extend or contract proportionally with a contraction or extension of the flexible elongate member 104 in general.

FIG. 3 shows a length of rope 114 lying substantially flat, extending about a circuit C (indicated by dashed line C) and passing through itself at at least two intersections 107A, 107B of the circuit C (corresponding to partings 107A1, 107B1 of the notional sections 104A, 104B of the elongate member 104) so as to assume a triple infinity loop configuration comprising two end noose portions 108, 109 at opposing ends thereof and an intermediate noose portion 110 therebetween.

The flexible elongate member 104 may be described as comprising at least one length of rope 114 circuitously formed so that the flexible elongate member 104 passes through itself and defines three sequentially adjacent noose portions 108, 109, 110, wherein the above-mentioned length of rope's 114 extension through or looping/lapping about the circuit C may be understood as a circuitous formation thereof.

It will be appreciated that the circuit C may thereby be described as a notional endless circuit in that it defines the notional endless path that the length of rope 114 follows or laps in forming the elongate member 104.

The plan shape of the notional endless circuit C may also be described as similar to a circular loop of rope (of one or more laps of rope) that is double-twisted upon itself, In other words, a closed continuous loop of rope, can be double twisted upon itself to yield a similar shape to the notional endless circuit C.

Thus, the circuit C may be said to comprise a double twisted configuration defining two end noose portions 108, 109 at opposing ends thereof and an intermediate noose portion 110 therebetween, the at least one length of rope passing through itself at intersections 107A, 107B (at the "twists") between the intermediate noose portion and each of the end noose portions (corresponding to partings 107A1, 107B1 of the notional sections 104A, 104B).

In this manner, the flexible elongate member 104 may be said to comprise or formed as at least one length of rope 114 arranged into an endless circuit or loop C that is double twisted and defining between two ends of the loop C a first section 104A of the elongate member and a second section 104B of the elongate member 104, wherein at a first twist of the loop C (i.e., at second end noose 109) the first section 104A of the elongate member passes through a parting 107B1 of the second section 104B, and at the second twist of the loop (i.e., at first end noose 108) the second section 104B of the elongate member 104 passes through a parting 107A1 of the first section 104A.

Only one length of rope 114 is needed to form the notional double-twisted configuration/triple infinity loop/continuous endless loop/continuous endless circuit of the elongate member 104 and thus shackle body 101.

In other words, the flexible elongate member 104 may be described as comprising at least one length of rope 114 formed into an endless circuit C having three continuous nooses, or three sequentially adjacent noose portions 108, 109, 110 with a twist at each intersection 107A, 107B between said noose portions 108, 109, 110, where the noose portions 108, 109, 110 may be understood as rope-enclosed regions of said elongate member 104.

In FIG. 3 the length of rope 114 is formed into the endless circuit C by passage of the rope 114 through only one lap of said circuit C, thereby forming one rope section 114.

However, in FIG. 7D described in further detail below, the length of rope 114 is formed into the endless circuit C by passage of the rope 114 through four laps of said circuit C, wherein each lap so forms or so defines four rope sections 114A, 114B, 114C, 114D (where coplanar layers 114W of FIG. 7D may define ropes 114A, 114B of FIGS. 4A and 4B an where coplanar layers 114Q of FIG. 7D may likewise define ropes 114C, 114D of FIGS. 4A and 4B).

It will be appreciated that the section(s) of rope 114 and the elongate member 104 will be sufficiently flexible and/or bendable so as to follow or lap the notional endless circuit or loop C i.e., so as to be able to bend into the triple infinity loop or double-twisted shape of the shackle body 101.

The length of rope 114 preferably comprises of multiple braids each comprising multiple fibres. The braids may be interwoven and/or spliced with one another and/or other braids. The ends of the rope(s) 114 are preferably spliced onto itself or onto another length of rope of the multi-rope assembly.

Figure 4B:
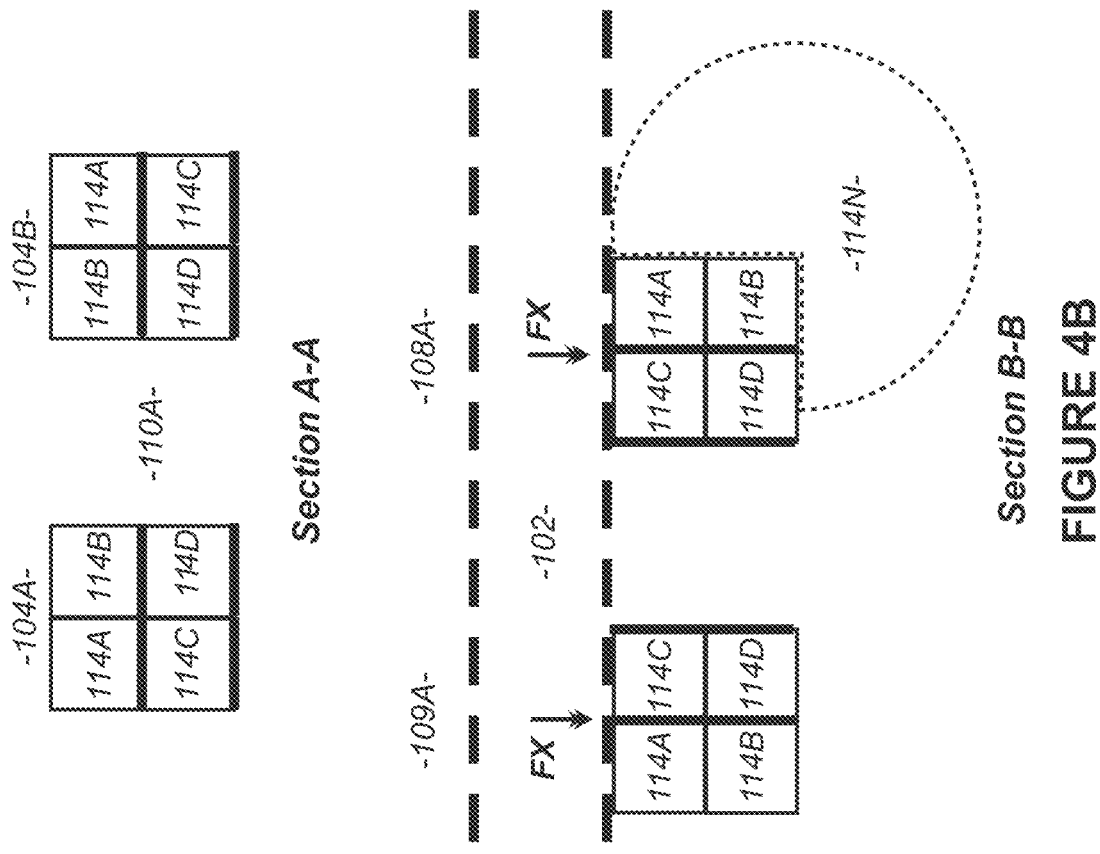
FIG. 4B: shows schematic cross-sectional views of the multiple sections of rope of FIG. 4A.
Figure 4A:
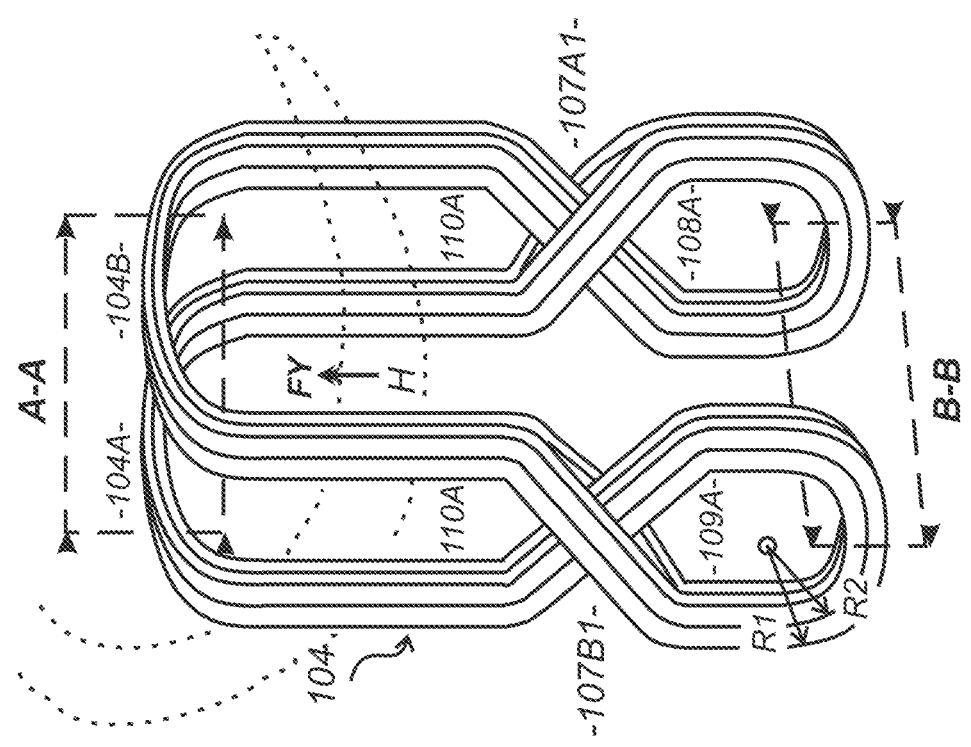
FIG. 4A: shows a perspective view of an example multiple sections of a length of rope according to another embodiment of the present invention.

FIG. 4A shows an elongated member 104 comprising (or formed from) a length of rope 114 formed into four rope sections 114A, 114B, 114C, 114D. The rope sections 114A, 114B, 114C, 114D shown therein take a substantially square cross-sectional shape for illustrative purposes only.

This has been done to illustrate the desirable "stacked" arrangement of the rope sections relative to each other, wherein the four rope sections 114A, 114B, 114C, 114D, are arranged in a stacked arrangement a first pair of the rope sections atop a second pair of the rope sections (where sections 114A, 114B defining the first pair are atop sections 114C, 114D defining the second pair, as shown in Section A-A of FIG. 4B), both rope sections of each of the first and second pair arranged in a coplanar, parallel, near-adjacent and/or near-contiguous arrangement relative one another. A stacked arrangement has advantages that will be described below.

FIG. 4A shows a cross-sectional plane A-A taken through the top of the intermediate noose portion 110 i.e., the plane extending across the eye 110A thereof. There can also be seen a cross-sectional plane B-B extending through the eyes 108A, 109A of the end noose portions 108, 109 i.e., extending in a direction perpendicular to plane A-A. The resulting cross-sections are illustrated schematically in FIG. 4B.

The resulting cross-sections are illustrated schematically in FIG. 4B wherein Section A-A shows a mirrored positioning of the rope sections 114A, 114B, 114C, 114D when comparing the cross-sections of notional sections 104A and 104B of the elongate member (where rope 114A is positioned in top-left corner of 104A, then at top-right corner of 104B and rope 114B is positioned in top-right corner of 104A, then at top-left corner of 104B etc.).

Section B-B shows that these positions of rope sections 114B and 114D can change orientation (such as at an end noose portions 108 or 109, but it may also occur at the intermediate noose portion 110), such that rope section 114B is now at the bottom-left corner of end noose portion 108, and at the bottom-right corner of end noose portion 109.

When a pin 102 (as shown notionally in Section B-B) is placed through the eyes 108A, 109A of the end noose portions 108, 109, a load (as shown by arrows FX of Section B-B of FIG. 4B) is distributed largely across the contacting upper surface/periphery of the elongate member 104. Thus, when a single rope 114 is used, it's diameter must be large enough such that the surface area it presents for said load-bearing is sufficiently large so as to distribute the load thereacross without yielding/failing of the elongate member 104. By contrast, if multiple rope sections 114 are employed, the load of notional pin 102 is distributed across each rope, and so their diameters can each be made smaller.

This is illustrated schematically in Section B-B, where notional single rope elongate member 114N is shown having a much larger cross-sectional area than the multi-rope section elongate member 114A/114B/114C/114D, where the upper half of the circumference of notional single rope elongate member 114N is about equal in length to the upper surfaces of each of four ropes 114A/114B/114C/114D, thus exemplifying the material-saving benefits of using multiple rope sections as opposed to a single rope for an equivalent load-bearing shackle 100 embodiment.

Using a flexible elongate member 104 of multiple sections of rope 114 may yield an elongate member 104 having about a 20-25% smaller diameter than an equivalent break strength of an elongate member 104 having a single length of rope 114 of the same material. This means the shackle body 101 can be lighter for ease of handling.

The flexible elongate member 104 when comprising a length of rope 114 formed into multiple rope sections as herein described also provides reduced creep under load when compared to the use of a single section of rope of the same material such as a 12-strand rope.

When a lifting element (i.e., the hook of a crane H shown as dotted lines in FIG. 4A) passes underneath said sections 104A, 104B to lift said shackle 100 (i.e., passes underneath sections 104A, 104B and in same direction as plane A-A), it may impart an upward lifting force extending upwardly, as indicated by arrow FY in FIG. 4A. The resulting response force of each rope will cause the downwardly-facing surfaces (indicated by the bold lines in Section A-A of FIG. 4B) of each rope to stretch/extend horizontally.

However, due to the change in orientation/positions of said ropes mentioned above, and as shown in Section B-B, those same surfaces of each rope are now oriented substantially vertically, such that when downward forces FX of pin 102 are imparted on end noose portions 108, 109, those now-vertical/now-substantially vertical surfaces will contract/shorten substantially vertically.

This difference in extension, contraction and load bearing applies to each surface of each rope/ropes. In this way, the continuous, endless loop of elongate member 104, and its passage through itself and resulting changes in orientation, provides the additional benefit of different load distribution and contraction/extension at different points therealong, providing a more distributed load bearing of shackle 100 when compared to a rigid/metal shackle.

It will be appreciated that, when more than one section of the length of rope 114 is employed, in order to follow or lap the same endless circuit or loop C while remaining in a coplanar, parallel, near-adjacent and/or near-contiguous arrangement with one another, the plurality of lengths of rope(s) 114 may not be of the same length to compensate for smaller/larger radius at turns of the circuit or loop C experienced by the lengths of rope 114. (i.e., at where the rope(s) twist about end nooses 108, 109).

For instance, as shown in FIG. 4A if notional radii are taken from a notional centre of eye 109A of end noose portion 109, the notional radii R1 of the outer-most rope sections (114B/114D as shown in Section B-B of FIG. 4B) is larger than the notional radii R2 of the inner-most rope sections (114A/114C as shown in Section B-B of FIG. 4B). Likewise, the lengths of rope sections may be different so that they remain in a coplanar, parallel, near-adjacent and/or near-contiguous arrangement with one another around the notional endless circuit/loop C of the elongate member 104.

The lengths of rope may operate at the high stress regions of the shackle 100 (i.e., at the bottoms of end noose portions 108, 109) and may in some embodiments be, for example, of a larger diameter than parts of the rope(s) 114 at other regions of the shackle 100. This can provide for weight saving to the shackle 100 by allowing lighter/smaller rope(s) 114 to be used at regions of lower stress.

FIG. 4B also illustrates the orientation of the rope sections 114A, 114B, 114C, 114D at Section B-B (i.e., at where the shackle pin 102 is positioned in use) is perpendicular, transverse, right-angled or about 90 degrees relative a longitudinal axis or length of the shackle pin 102 extending through the eyes 108A, 109A of the end noose portions 108, 109, or through the bow of the shackle.

This ensures that a maximal surface area of the rope sections 114A, 114C contacts the pin 102 surface, improving maximum load bearing capability and increasing the coupling action of the bow or end noose portions 108, 109 to the pin 102.

Likewise, the orientation of the rope sections 114A, 114B, 114C, 114D at Section A-A (i.e., at where the hook H is positioned for lifting) is perpendicular, transverse, right-angled or about 90 degrees relative direction said hook H extends across and through the eye 110A of the intermediate noose portion 110 of the shackle.

This also thereby ensures that a maximal surface area of the rope sections 114C, 114D contacts the hook H surface, increasing the lifting or other movement action of the hook H upon the shackle.

It will be appreciated that:
 the parallel, near-adjacent and/or near-contiguous arrangement of said rope sections 114A, 114B, 114C, 114D,
 their orientations at Section A-A relative Section B-B (i.e., orientations at the 'top' of the shackle in use versus the 'bottom' of the shackle in use), and
 their self-intersecting/self-passing through one another configuration as has been described above,
result in the perpendicular, transverse, right-angled or about 90-degree relative orientation of the rope sections relative the lifting or load bearing elements to be used with the shackle (i.e., hook H and pin 102) such that maximum contacting surface area and thus effective load or force transfer occurs at the locations of the shackle where said forces or loads are imparted thereon.

In other words, the flexible elongate member 104 of the shackle may be configured such that its rope section(s), when in use, is/are oriented at the intermediate noose portion 110 and/or end noose portions 108, 109 (the bow) in a manner so as to present a maximum surface area for contact with a lifting or movement member such as a hook and/or a shackle pin 102, respectively.

FIG. 5C shows an example pin 102 located within the eye 108A of the first end noose portion 108, wherein the diameter of the pin 102 is shown as D1 and the diameter of the elongate member 104 at the end noose portion 108 is shown as d2. The ratio of D1:d2 may be understood in the art as the 'D:d' ratio, whereby D represents the ratio of the pin/object being shackled and d represents the ratio of the part of said shackle bent, capturing or wrapping about said pin/object.

In known rope or wire shackles, the D:d ratio may be about 4:1, and in polyester sling shackles, about 2.5:1. In other words, the thickness of part of said shackle bent, capturing or wrapping about said pin/object must be substantially larger in known flexible shackles, therefore resulting in heavier and expensive shackles.

By comparison, embodiments described herein of a shackle body 101 having an elongate member 104 may permit a D:d ratio of about 1:1, meaning a reduction in material usage, weight and thus cost, and further permitting use of regular pins and shackle fittings known in the art (i.e., used with conventional rigid/metal fittings) when compared to known flexible shackles which must in some instances employ additional components to compensate for said D:d ratios. Thus, in some embodiments, a diameter of the flexible elongate member 104 is substantially equal to a diameter of the shackle pin 102 when so used with the shackle body 101.

As mentioned above, this advantage in D:d ratio may result, in particular, in weight savings compared to equivalent 'work-load-limit' (WLL) flexible shackles known in the art. Even more so, this advantage in D:d ratio may result in significant weight savings compared to equivalent workload-limit rigid (i.e., metallic) shackles known in the art, wherein in some embodiments:
- an embodiment shackle 100 may weigh about between 2.2 kg and about 4.6 kg compared to a rigid shackle having an equivalent 17,000 kg WLL and weighing about 8.6 kg;
- an embodiment shackle 100 may weigh about between 11 kg and about 19 kg compared to a rigid shackle having an equivalent 55,000 kg WLL and weighing about 45 kg;
- an embodiment shackle 100 may weigh about between 60 kg and about 115 kg compared to a rigid shackle having an equivalent 300,000 kg WLL and weighing about 359 kg;

The example ranges and values given above are indicative only of potential weight savings achievable by embodiments of a shackle 100 described herein.

In one example the at least one length of rope 114 is a multi-braided rope, preferably of an Ultra-High Molecular Weight Polyethylene (UHMwPE) or High Molecular Weight Polyethylene (HMwPE), even more preferably it is rope as sold under the trade names Dyneema® or Spectra®. An example of a portion of such a multi-braided rope 114P is shown in FIG. 5B.

In one embodiment the rope is of an aramid, more preferably a para-aramid high performance fibre, even more preferably and/or the fibre as sold under the trade name Technora® and/or Kevlar®.

Use of UHMWPE rope is advantageous because UHMWPE can make the coupling device stronger than steel by weight and also much stronger than Polyester rope of equal weight. Hence, the shackle 100 can be made strong enough to be suitable for lifting, towing or connecting heavy machineries or equipment yet be light enough to be more easily handled than steel coupling devices or similar strength.

Due to employment of such material(s), the shackle 100 can be much smaller in volume and weight compared to a metal equivalent, making the shackle 100 suitable for easy storage and rapid deployment such as in emergency cases even by an individual person. The total weight of the shackle may be between 6 kg and 60 kg. In one embodiment, the total weight of the shackle is 30.9 kg. In one embodiment, the total weight of the shackle is 10.5 kg. In one embodiment, the total weight of the shackle may be less than 20 kg, or less than 15 kg, or less than 10 kg. Preferably, the total weight of the shackle 100 is 8 kg or approximately 8 kg, more preferably 8.2 kg. In one embodiment, the total weight of the shackle 100 is more than 7 kg.

A shackle 100 for a break strength of 100,000 kg may weigh around 2.1 kg. A shackle 100 for a break strength of 120.00 kg may weigh around 2.3 KG. A shackle 100 for a break strength of 140,000 kg may weigh around 2.7 kg. A shackle 100 for a break strength of 160,000 kg may weigh around 2.9 kg. A shackle 100 for a break strength of 180,000 kg may weigh around 3.1 kg. A shackle 100 for a break strength of 200,000 kg may weigh around 3.3 kg. A shackle 100 for a break strength of 510,000 kg may weigh between 8.5 kg and 19 kg.

The weight of the shackle 100 is much lighter as compared to total weight of a steel shackle (which typically weigh higher than 60 kg) normally used in heavy industry for similar purposes. The shackle 100 of the present invention may be at least three times lighter than shackles made using heavier materials such as steel for similar purposes. The shackle 100 of the present invention can provide a weight savings of roughly 50-70% depending on the various sizes ranging from 17 tonne-300 tonne workload limit (WLL).

In one embodiment when loaded to a safe load limit, the maximum stretch of the shackle at failure can be less than 5-10 percent (preferably less than 5 percent).

In one embodiment when loaded to a load limit, the maximum stretch of the shackle at failure can be between about 0.5 to 1 percent.

In one embodiment when loaded to a load limit, the maximum stretch of the shackle at workload limit (WLL) is no more than 0.5 to 1%.

In one embodiment, the shackle is designed to be loaded to a load limit of at least 20,000 kg. In one embodiment, the maximum stretch of the shackle is around 5% when coupled to a load of more than 100,000 kg.

The pin 102 and flexible elongate member 104 can be designed in the preferred form to ensure that at failure of the shackle 100, it is the flexible elongate member 104 that fails first and not the pin 102. It is preferably a tensile failure of the flexible elongate member 104 that causes failure of the shackle 100. The flexible elongate member 104 may therefore be described as the sacrificial or yielding element of the shackle 100 as a whole. The shackle 100 may thus be considered a soft shackle, but may be used in a similar way as how conventional all-metal shackles are used.

The present invention can achieve a Working Safe Load of over 5:1. A coupling for MBS510,000 kg may exhibit only 4% elongation at MBS.

A coupling may exhibit between about 0.5 to 1% elongation at MBS.

Preferably the amount of total rope used within the flexible elongate member is 50 meters. In one embodiment, the total amount of rope used within the flexible elongate member is greater than 40 meters. In another embodiment, the total amount of rope used within the flexible elongate member may be between 43-48 meters. The closed loop measurement of the coupling device 100, 200 may be less than 1000 mm or less than 750 mm or more than 500 mm.

It can be appreciated that the invention described above can be used as other types of coupling device than a shackle. For example, the flexible elongate member 104 or the shackle body 101 may be used for coupling, pulling, towing and lifting two objects. For example, the first eye 108A may loop around a first object or part of the first object and the second eye 109A may loop around the second object or part of the second object thereby coupling the first and second objects together.

The application of a lubricant such as Vaseline™ may also be desirable to the rope 114 or to each or some of the sections of rope 114. The application of a lubricant helps in the performance of the elongate member 104 once it is under use load conditions. The application of a lubricant to the rope 114 or to each or some of the sections of rope 114 helps reduce the generation of heat in the rope under extreme loads as there is less friction created in the coupling device. The shackle may have a high heat resistance, which may be advantageous in high-heat appellations, such as for use in coal mines for example.

One non-limiting example method of forming an elongate member 104 from a single length of rope 114 will now be described with reference to FIGS. 6A to 6E.

As shown in FIG. 6A, a single length of rope 114 is provided in the form of an enclosed/endless loop. Partings 107A1 and 107B1, as hereinbefore described, are formed into said rope 114 (via puncturing/severing into said rope, or otherwise integrally formed as part of said rope).

In FIG. 6B parts 114X, 114Z of the rope 114 adjacent each parting 107A1 and 107B1 are moved in a direction towards said partings 107A1 and 107B1, and in FIG. 6C said parts 114X, 114Z of the rope 114 are pulled through said partings 107A1 and 107B1.

In FIG. 6D said pulling continues, with the first and second eyes 108A, 109A of first and second end noose portions 108. 109 beginning to form. Likewise, intermediate eye 110A and intermediate noose portion 110 is also beginning to form.

Finally, in FIG. 6E the length of rope 114 has formed into the appropriate double-twisted configuration/triple infinity loop/endless loop/notional endless circuit of the elongate member 104 as described above.

Following this, the single length of rope 114 the elongate member 104 so formed may be provided a cover 112 as previously described and employed in use as a shackle body 101 of a shackle 100.

An example method of forming an elongate member 104 from multiple sections of a length of rope 114 (in particular, a four-section rope 114 embodiment of the elongate member 104 as shown in FIG. 4A) will now be described with reference to FIGS. 7A to 7E.

Figure 7A:
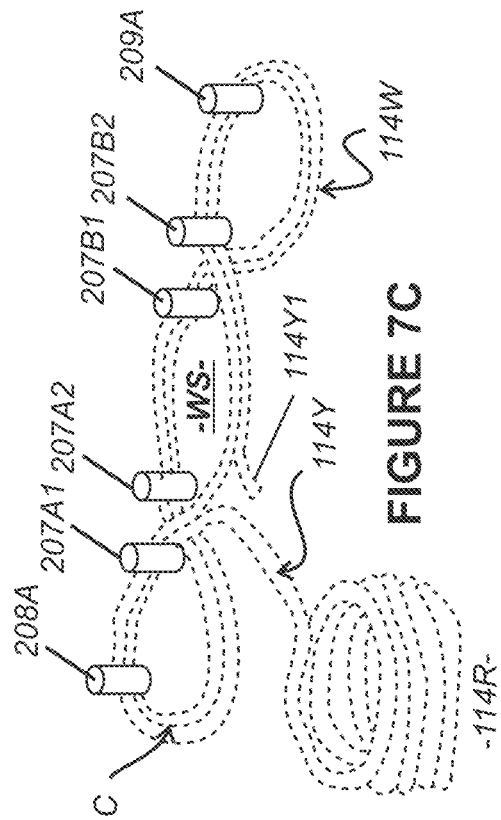
FIG. 7A-D: shows the steps in an alternative process of how the rope may be formed into the desired configuration.

In FIG. 7A an arrangement of six posts are shown, end noose posts 209A, 209B and intersection posts 207A1, 207A2, 207B1, 207B2 atop a flat work surface WS as a means to wind the ropes 114 around so as to form the double-twisted/triple infinity loop configuration.

The posts 209A, 209B, 207A1, 207A2, 207B1, 207B2 may be distanced/spaced apart depending on the desired end-size of the elongate member 104 to be formed therefrom, and also distanced/spaced apart such that winding rope(s) 114 therearound creates tension along the rope(s) 114 length during said formation of said elongate member 104.

However, many other means could be employed to wind or lap said ropes 114 into the appropriate notional endless circuit C. The notional endless circuit C can be seen in FIG. 7A. Further, the work surface WS may not be necessarily horizontal/flat, and in some embodiments may not even be required (i.e., the posts instead extending horizontally such that winding/formation of the elongate member 104 occurs about a substantially vertical plane).

Other arrangements may be used for formation of said multiple length of rope 114 embodiment elongate member 104.

Figure 7B:
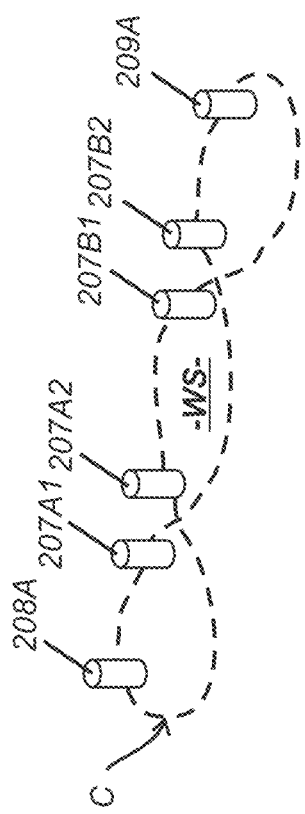

A length of rope 114Y is shown in FIG. 7B, fed off a reel or coil 114R of said rope or otherwise. The length of rope 114Y has a free or distal end 114Y1.

Figure 7C:
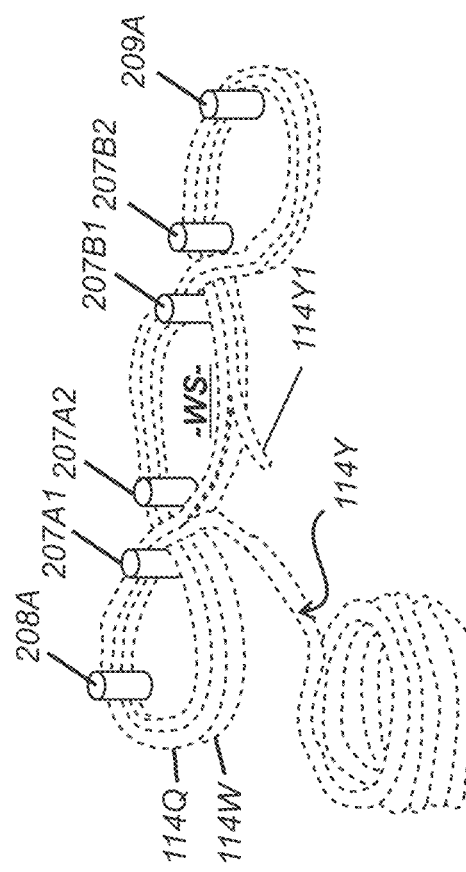

Said length of rope 114Y is then fed along the notional circuit C, where two coplanar layers 114W are arranged atop the work surface WS, as shown in FIG. 7C, i.e., two coplanar/parallel near-adjacent or near-contiguous laps of the circuit C have been made by said rope 114Y, thereby forming (two laps of) the three 3 sequentially adjacent noose portions 108, 109, 110 or rope-enclosed regions. The free or distal end 114Y1 of said rope 114Y is shown extending out from said coplanar layers 114W i.e., resting upon work surface WS.

The intersection 170A, 170B and corresponding layered partings 170A1, 170B1 configurations' are seen to be taking form in FIG. 7C, where coplanar layers 114W are routed over each other in between posts 207A1, 207A2 and are routed underneath one another in between posts 207B1, 207B2 i.e., at the twists at each intersection 107A, 107B between the noose portions 108, 109, 110.

Figure 7D:
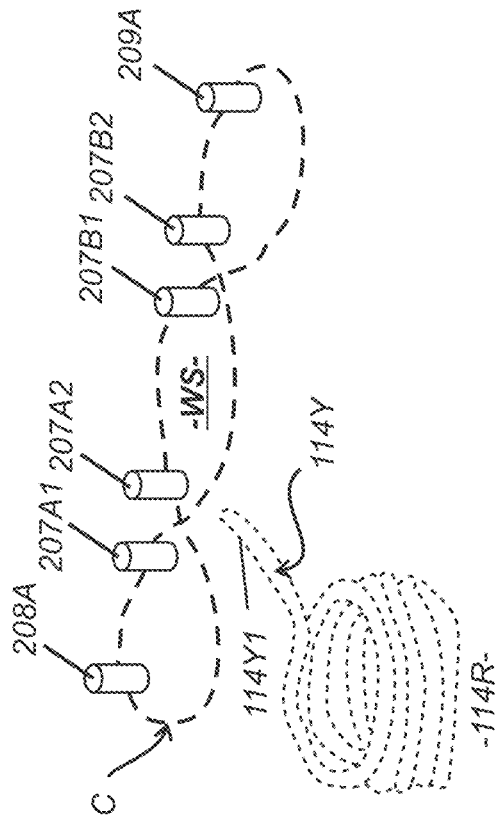

In FIG. 7D the process of winding the rope 114Y is continued, however, the next two coplanar layers 114Q are layered such that at one intersection 107A, a first parting is formed between posts 207A1, 207A2, (i.e., between coplanar layers 114W and coplanar layers 114Q) and likewise, at the next intersection 107B, a second parting is formed between posts 207B1, 207B2, (i.e., between coplanar layers 114W and coplanar layers 114Q), the winding of the coplanar layers 114Q continuing until four lengths of rope extend between a first parting at intersection 107A, and four lengths of rope also extend between a second parting at intersection 107B, wherein the partings comprise a split/parting between two coplanar layers 114Q, 114W.

Finally, once the appropriate layering of the four sections of rope take place (i.e., where coplanar layers 114W may define ropes 114A, 114B of FIGS. 4A and 4B an where coplanar layers 114Q may likewise define ropes 114C, 114D of FIGS. 4A and 4B), such that four laps of the circuit have been made, the length of rope 114Y may be cut off from said reel 114R and the severed end thereof end-joined/spliced to distal free end 114Y1, to complete formation of the elongate member 104 (i.e., the elongate member 104 of FIGS. 4A and 4B). Those skilled in the art may envisage various means of end-joining or splicing together the rope ends depending on the material chosen and given application.

Further, the order in which coplanar layers 114W, 114Q are fed or lapped along the notional circuit C as shown in FIGS. 7A to 7D is exemplary only, as is the location/s of the distal end 114Y1 and reel 114R of the length of rope 114Y (i.e., the feeding may begin and end at any point along said notional circuit C).

Further, it should be noted that in some embodiments, such a four-rope section may not be formed from a length of rope 114 as shown (i.e., from a reel 114R). Instead, one may arrange four already split/severed and approbatively dimensioned discrete lengths of rope, in the configuration shown, and end-join and splice them together at any given point along the notional circuit C.

Thus, more generally, a method of forming the flexible elongate member 104 of the shackle 100 may consist of
- a) providing at least one length of rope 114 that is either:
  - i. a continuous integrally formed length of rope; or
  - ii. a continuous length of rope formed via end-joining of a plurality of discrete non-continuous lengths of rope;
- b) circuitously arranging said at least one length of rope 114 to form a lap or loop on a continuous endless circuit C, wherein on the lap or loop the at least one length of rope 114 passes through itself at two intersections 107A, 107B;
- c) either performing step b) once such that said at least one length of rope 114 forms a single lap or loop about the continuous endless circuit C, or repeating step b) such that said at least one length of rope 114 forms a plurality of laps or loops on the continuous endless circuit so as to define a corresponding plurality of rope sections 114A, 114B, 114C, 114D . . . etc. of the at least one length of rope 114;
- d) end-joining the at least one length of rope 114 to itself so as to define three sequentially adjacent continuous rope-enclosed noose portions 108, 109, 110 comprising an intermediate noose portion 110 defined between the two intersections 107A, 107B and two end noose portions 108, 109 at opposing ends thereof.

FIGS. 8A-8D show a variety of example configurations how one may layer or arrange the rope 114 or rope sections 114 at each intersection 107A, 107B of the elongate member 104. FIGS. 8A-8D therefore also show how one may configure parting or splits at each intersection, where said example configurations of intersections 107X, 107Y, 107Q, 107P (and the partings thereof) shown in FIGS. 8A-8D and described below may define or correspond to either intersection 107A, 107B of the elongate member 104.

Figure 8B:
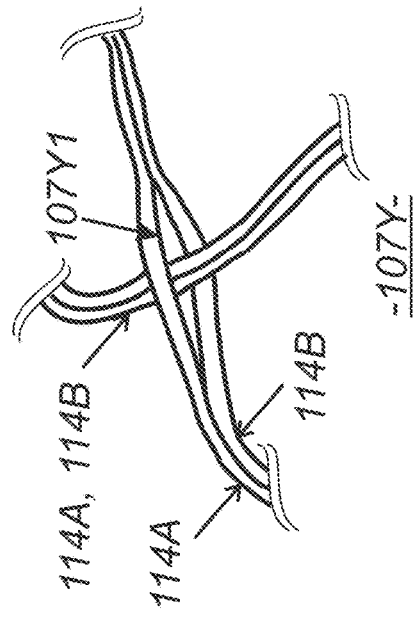
FIG. 8A-D: shows example configurations of partings at intersections of an elongate member according to embodiments of the present invention.
Figure 8D:
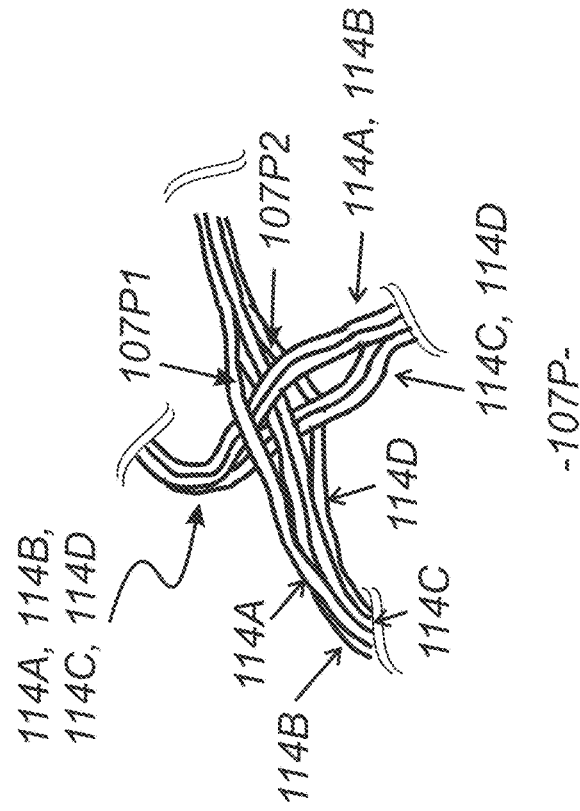
Figure 8A:
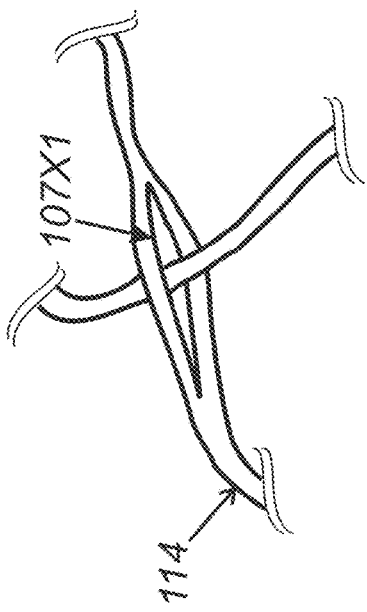

In FIG. 8A only a single rope section 114 is employed, and so it passes through a split 107X1 at intersection 107X formed within the rope section's body itself, as described above with reference to FIGS. 6A to 6E. This example configuration corresponds to the single-rope section embodiment elongate member 104 of FIG. 3.

In FIG. 8B two rope sections 114A, 114B are employed. At the intersection 107Y, the parting 107Y1 is formed by separating of the two sections 114A, 114B from one another. All two sections 114A, 114B pass through said parting.

Figure 8C:
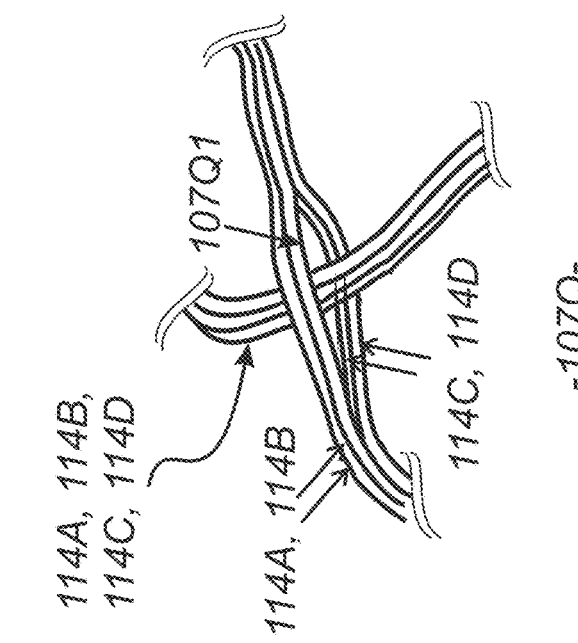

In FIG. 8C four rope sections 114A, 114B, 114C, 114D are employed. At the intersection 107Q, the parting 107Q1 is formed by separating two coplanar and parallel sections 114A, 114B from the other two coplanar and parallel sections 114C, 114D. All four rope sections 114A, 114B, 114C, 114D pass through said parting 107Q1. This example configuration corresponds to the four-rope section embodiment elongate member 104 of FIGS. 2A, 2B and 4.

In FIG. 8D four rope sections 114A, 114B, 114C, 114D are employed. At the intersection 107P, the 'top' parting 107P1 is formed by separating section 114A from coplanar and parallel sections 114B, 114C, and 'bottom' parting 107P2 is formed by separating section 114D from those same coplanar and parallel sections 114B, 114C. Sections 114A, 114B then pass through parting 107P1 and sections 114C, 114D pass through parting 107P2.

It should be noted that, in relation to FIG. 8D the particular sections passing through the partings 107P1, 107P2 are exemplary only, and any other variation could apply equally. Further, the configuration of the partings 107P1, 107P2 are also exemplary only. Many other configurations could be envisaged.

For instance, parting 107P1 may be instead formed by separating section 114A from section 114B, and parting 107P2 may be instead formed by separating section 114C from section 114D, with a third parting 107P3 formed between sections 114B and 114C. Then section 114A may pass through parting 107P1, sections 114B and 114C may pass through parting 107P3 and section 114D may pass through parting 107P2. In this way, a single section 114 resides both 'above' and 'below' each parting 107P1, 107P2, 107P3.

Further weave and layering configurations of partings may be envisaged for six, eight, ten or any numbered rope section embodiment of the elongate member 104.

It should also be noted that where partings are formed between a plurality of rope sections, said partings may be formed by a separation of a portion of at least one of the plurality of rope sections from a portion(s) of the other of the plurality of rope section(s), as shown in FIGS. 8A-8D.

It is generally preferred that all sections passing through partings at an intersection are 'enclosed' by sections thereabove and therebelow (i.e. pass through the enclosure defining a parting), such that exposure to external environment and thus dirt/debris accumulation is minimised at said intersections.

However, in some embodiments, a section may pass 'around' the partings of a particular intersection, if so desired by a particular application.

FIG. 10A shows an example elongate member 104 comprising (or formed from) a length of rope 114 formed into four rope sections 114A, 114B, 114C, 114D i.e., as shown and previously described in relation to FIG. 4A.

FIG. 10A illustrates examples of optional means of keeping the desirable "stacked" arrangement of the rope sections consistent across the length of the elongate member 104, applied to said embodiment four-rope elongate member 104.

For example, a holding member 300 can be placed around the elongate member 104, at just above the first and second intersections 107A, 107B (and/or partings 107A1, 107B1), where said holding member 300 comprises a winding of elongate material wound or otherwise wrapped around just above said intersections 107A, 107B, so as to bring together the four rope sections 114A, 114B, 114C, 114D and keep them in aligned and positioned relative one another as desired for the "stacked" arrangement hereinbefore described.

Four of such holding members 300 are seen in FIG. 10A for illustrative purposes, at each point along the elongate member 104 above the intersections 107A, 107B.

In some instances, holding member couplers 300A can extend along a length of said holding members 300, between one face of a holding member 300, through and in between any two of the rope sections 114A, 114B, 114C, 114D, then through to the other opposing face of the holding member 300.

In FIG. 10A two of the holding members 300 are shown having two holding member couplers 300A each, configured as described above.

Also shown in FIG. 10A are a plurality of support windings 302, extending along the elongate member 104 between the holding members 300, i.e., along the parts of the elongate member 104 between the intersections 107A, 107B (the parts that form/enclose the intermediate noose portion 110A).

These plurality of support windings 302 may be wound or otherwise wrapped around the elongate member 104, and may also wind in between and through the various rope sections 114A, 114B, 114C, 114D, so as to collate and bring together said rope sections 114A, 114B, 114C, 114D into the "stacked" arrangement hereinbefore described.

Such material wound or otherwise wrapped to form said holding member 300 as well as the support windings 302 may comprise any suitable elastic or resilient material, such as string, elastic or rubber string, single-braid rope, multi-braided rope, Ultra-High Molecular Weight Polyethylene (UHMwPE) or High Molecular Weight Polyethylene (HMwPE) and/or rope as sold under the trade names Dyneema® or Spectra® or constituent fibre(s) thereof/therefrom.

Said support windings 302, when so optionally provided, may not extend along the entire length of the elongate member 104 parts between said intersections 107A, 107B, as shown, but may only extend along part of said parts, and along only one of said parts.

In some embodiments, said support windings 302 may be provided to extend along the length of the elongate member 104 along the end noose portions 108, 109.

In some embodiments, the holding members 300 may be placed 'beneath' (i.e., when viewing FIG. 10A) and adjacent the first and/or second intersection(s) 107A, 107B and at said end noose portions 108, 109, such that a holding member 300 is provided at both ends of the first and/or second intersection(s) 107A, 107B i.e., at both ends of where the split or partings 107A1, 107B1 begin and end.

The holding members 300 may be placed also at the end noose portions 108, 109, not near or adjacent the first and/or second intersection(s) 107A, 107B i.e., at the 'bottoms' of the end noose portions 108, 109 (at where a pin 102 may impart a load thereon).

The holding members 300 may not need to be provided at each of the four locations along the elongate member 104 at/above said intersections 107A, 107B.

Note that both holding members 300 and support windings 302 may be provided for any embodiment shackle 100 where a plurality of rope sections 114 are employed, so as to help keep said plurality of rope sections 114 in a desirable orientation or position relative one another along at least part of the length of a given elongate member 104 formed thereby.

Moreover both the holding members 300 and/or support windings 302 may be configured to provide only partial constraint or engagement with the elongate member 104 i.e., not a tight 'fit'/only a loose 'fit' with/around the rope sections 114, so as to still enable movement of the rope sections 114 through/between said holding members 300 and/or support windings 302 during deformation of the shackle body 101 when in use.

FIG. 10B illustrates an embodiment elastic sheath arrangement comprising main sheath 410 and noose sheath(s) 408, 409.

Said elastic sheath arrangement, in particular each of the main sheath 410 and two noose sheath(s) 408, 400 shown, comprise a single body of elastic material forming a 'sock' or sheath that encapsulates the elongate member 104, where the noose sheath 408 is a sock or sheath wrapping around and along the first end noose portion 108, the noose sheath 409 is a sock or sheath wrapping around and along the second end noose portion 109, and the main sheath 410 around and along the intermediate noose portion 110, and as shown, also partly around both end noose portions 108, 109.

This elastic sheath arrangement may be formed from a suitable elastic fibre arrangement, such that said sheath(s) 408, 409. 410 temporarily stretch and contract in unison/concert with their respective first, second and intermediate noose portions 108, 109, 110 and/or with the shackle body 101 as a whole, as it temporarily deforms in response to bearing or un-loading a load or hook etc. as previously described.

In other words, the sheath(s) 408, 409. 410 may temporarily change in shape/deform in concert with the shackle body 101 during use thereof, before resiliently or elastically returning to their original shape/size in concert with the shackle body 101.

The fibres of said single body of elastic material, i.e., the fibres of each of sheaths 408, 409. 410, may therefore all extend longitudinally in a direction of and along the elongate member 104, i.e., such that they extend/stretch elastically in concert with the extension of the intermediate noose portion 110 (as it stretches/extends vertically as shown in FIG. 1) as well as in concert with the proportional extension across the elongate member end noose portions 108, 109 as a load is imparted upon the shackle 100 as a whole (i.e., when a load is placed upon pin 102 and a lifting hook is placed through the intermediate eye 110, as shown in FIG. 9 for instance).

Thus, said elastic sheath arrangement may act as a protective cover that when configured as described above, permits repeated extension and contraction of the elastic sheath arrangement in concert with use of the shackle 100, without the long-term damage or wear that may be imparted on a protective covering not so configured with elastic fibres extending longitudinally along the elongate member 104.

Moreover, by each sheath 408, 409. 410 being arranged as single unitary piece/body of elastic material forming a 'sock', one may easily pull back an end of said 'sock' to inspect the shackle body 101 underneath.

This is shown in FIG. 10B where said main sheath 410 has one end 410A, that partly extends across the first noose portion 108 and first noose sheath 408, and the other end 410B pulled/rolled/folded up and away from said second noose portion 109 and second noose sheath 409, for example for inspection of the intersection 107B.

Said elastic sheath arrangement may be optionally provided in lieu of or in addition to the cover 112 previously described above.

Said elastic fibre arrangement of the elastic sheath arrangement may be for instance Kevlar, or any other suitable elastic/resilient fibre arrangement.

The elastic sheath arrangement may be made from a material that is durable, stretchable and/or has high resistance against abrasion, tears, scuffs and friction.

FIG. 11A shows an example of a hook guard 500 comprising a body portion 502 and resilient connector portions 504.

Such a hook guard 500 may be optionally provided to be placed through the intermediate eye 110A of the shackle body 101 and underneath the upper-most part of the elongate member 104 thereat i.e., at a location where a hook or other part of a lifting equipment lifting said shackle 100 is to be positioned when lifting said shackle 100.

This is shown in FIG. 11B where said hook guard 500 extends along the intermediate portion 110, and wraps partially around both parts of it, with its resilient connector portions 504 extending around said parts of the intermediate portion 110 to connect to one another.

Said resilient connector portions 504 may comprise hook and eyelet/loop connectors/fasteners (i.e., Velcro) or other means (such as buckle or tightening arrangement) so as to connect to one another and thereby tighten and affix said hook guard 500 in the appropriate position where such a hook H is to lift the shackle 100 (i.e., to lift and move a load hung of the shackle pin 102).

Since such a hook H is to be positioned on the shackle body 101 at this location, when lifting/moving the shackle 100 and thus rubbing against the intermediate portion 110, the hook guard 500 may thereby provide a protective intermediate between the for example metal hook H and the shackle 100 itself.

This prevents or at least reduces damage and/or wear to the shackle body 101, elongate member 104, rope section(s) 114 and/or cover 112 and/or main sheath 410 when provided.

The hook guard 500 may in some embodiments therefore be a consumable or replaceable component, easily removed and replaced (by virtue of its connector portions 504) when so desired.

The substantially rectangular shape of the body portion 502 of the hook guard 500 is exemplary only in that other shape(s), length(s) and/or sizes of the body portion 502 may be envisaged, i.e., to wrap around the entire circumference of the elongate member 104 at the location where a hook H is to lift the shackle 100, or to extend longitudinally along a shorter or longer length of the intermediate portion 110 of the elongate member 104.

Those skilled in the art may envisage a variety of other methods or means of forming said single-rope or multi-rope embodiments of the elongate member 104 different to those described above.

Where in the foregoing description reference has been made to elements or integers having known equivalents, then such equivalents are included as if they were individually set forth.

It will of course be realised that while the foregoing description has been given by way of illustrative example(s) of the present invention, all such modifications and variations thereto as would be apparent to a person skilled in the art are deemed to fall within the broad scope and ambit of the various aspects of invention as is hereinbefore described and/or defined in the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A shackle comprising:
a shackle body for use with a shackle pin, the shackle body comprising:
a flexible elongate member comprising at least one length of rope circuitously formed so that the flexible elongate member passes through itself and defines three sequentially adjacent noose portions, wherein the at least one length of rope defines a continuous endless circuit, and the flexible elongate member passes through itself at two intersections of itself.

2. The shackle of claim 1, wherein the three sequentially adjacent noose portions comprise an intermediate noose portion and two end noose portions at opposing ends of the shackle body.

3. The shackle of claim 2, wherein a contraction or extension of the intermediate noose portion causes a movement of said length of rope through where the elongate member passes through itself, thereby effecting a proportional tightening or loosening of one or each of said end noose portions.

4. The shackle of claim 3, wherein the shackle pin, when used with the shackle body, is configured to extend through eyes defined by the end noose portions such that a tightening of said end noose portions promotes a contraction of said eyes about said shackle pin and a corresponding coupling of the shackle pin to the shackle body.

5. The shackle of claim 4, wherein a first intersection of the two intersections defines a transition of the flexible elongate member from the intermediate noose portion to a first end noose portion of the two end noose portions, and a second intersection of the two intersections defines a transition of the flexible elongate member from the intermediate noose portion to a second end noose portion of the two end noose portions.

6. The shackle of claim 5, wherein notionally defined at or around two parts of the flexible elongate member that define the intermediate noose portion is a first notional section of said flexible elongate member and a second notional section of said flexible elongate member, wherein at the first intersection of the flexible elongate member the first section of said flexible elongate member passes through a second parting of the second section, and at the second intersection of the flexible elongate member the second section of said flexible elongate member passes through a first parting of the first section.

7. The shackle of claim 6, wherein the first parting of the first section is formed by a split within the at least one length of rope thereat and the second parting is formed by a split within the at least one length of rope thereat, the length of rope passing through said splits of said partings such that its movement therethrough upon a contraction or extension of the intermediate noose portion effects a proportional tightening or loosening of one or each of said end noose portions.

8. The shackle of claim 6, wherein the flexible elongate member comprises a plurality of rope sections of said length of rope, each rope section corresponding to a loop of a plurality of loops that the length of rope circuitously forms.

9. The shackle of claim 8, wherein the first parting of the first section is formed by a separation of a portion of at least one of the plurality of rope sections from a portion(s) of the other of the plurality of rope section(s) at the first section, and the second parting of the second section is formed by a separation of a portion of at least one of the plurality of rope sections from a portion(s) the other of the plurality of rope section(s) at the second section.

10. The shackle of claim 9, wherein at least one of the plurality of rope sections at the first section of said flexible elongate member passes through the second parting of the second section, and wherein at least one of the plurality of rope sections at the second section of said flexible elongate member passes through the first parting of the first section, such that, a movement of said at least one of the plurality of rope sections at the first and second sections through said first and second partings, upon a contraction or extension of the intermediate noose portion, effects a proportional tightening or loosening of said end noose portions.

11. The shackle of claim 10, wherein at least two of the plurality of rope sections at the first section of said flexible elongate member passes through the second parting of the second section in a coplanar, parallel, near-adjacent and/or near-contiguous arrangement relative one another, and wherein at least two of the plurality of rope sections at the second section of said flexible elongate member passes through the first parting of the first section in a coplanar, parallel, near-adjacent and/or near-contiguous arrangement relative one another.

12. The shackle of claim 10, wherein the flexible elongate member comprises two rope sections of said length of rope, wherein both of the rope sections at the first section of said flexible elongate member pass through the second parting of the second section so formed by separation of portion(s) of the two rope sections at the second section from one another, and wherein both of the rope sections at the second section of said flexible elongate member pass through the first parting of the first section so formed by separation of portion(s) of the two rope sections at the first section from one another.

13. The shackle of claim 12, wherein the two rope sections at the first and second sections of said flexible elongate member are arranged in a coplanar, parallel, near-adjacent and/or near-contiguous arrangement relative one another when passing through the first and second partings of said first and second sections.

14. The shackle of claim 1 wherein the at least one length of rope comprises a continuous integrally formed length of rope or a continuous length of rope formed via end-joining of a plurality of discrete non-continuous lengths of rope.

15. The shackle of claim 1, wherein a first twist of the flexible elongate member is defined by and located at the first intersection of the two intersections and a second twist of the flexible elongate member is defined by and located at the second intersection of the two intersections.

16. The shackle of claim 1, wherein the shackle pin forms part of a pin assembly, the pin assembly further comprising a clamping member that is configured to move between a clamped position and an unclamped position, wherein when in the clamped position the clamping member is configured to clamp at least one end of the pin thereby facilitating locking and securing of the pin within the eyes of the end noose portions, and when in when in the unclamped position the clamping member is configured to unclamp the pin thereby allowing release of the pin from the eyes of the end noose portions.

17. The shackle of claim 1, wherein the flexible elongate member is at least in part protectively and collectively ensheathed using at least one cover extending substantially around and along said flexible elongate member.

18. A shackle body for use with a shackle pin, the shackle body comprising:
a flexible elongated member comprising of at least one length of rope arranged as a continuous endless loop that is double twisted and defining between two ends of the loop a first notional section of said elongated member and a second notional section of said elongated member,
wherein:
at a first twist of the loop the first section of said elongated member passes through a parting of the second section, and
at the second twist of the loop the second section of said elongated member passes through a parting of the first section.

19. A shackle comprising:
a shackle body for use with a shackle pin, the shackle body comprising:
a flexible elongate member comprising at least one length of rope circuitously formed so as to define a continuous endless circuit such that the flexible elongate member passes through itself at two intersections of itself and defines three sequentially adjacent noose portions comprising an intermediate noose portion and two end noose portions at opposing ends of the shackle body, wherein:
(i) a first intersection of the two intersections defines a transition of the flexible elongate member from the intermediate noose portion to a first end noose portion of the two end noose portions, and a second intersection of the two intersections defines a transition of the flexible elongate member from the intermediate noose portion to a second end noose portion of the two end noose portions, and
(ii) a contraction or extension of the intermediate noose portion causes a movement of said length of rope through the two intersections, thereby effecting a proportional tightening or loosening of one or each of said end noose portions such that when the shackle pin is used with the shackle, and extends through eyes defined by the end noose portions, a tightening of said end noose portions promotes a contraction of said eyes about said shackle pin and a corresponding coupling of the shackle pin to the shackle body.

* * * * *